United States Patent
Murakawa et al.

(10) Patent No.: US 6,643,400 B1
(45) Date of Patent: Nov. 4, 2003

(54) IMAGE PROCESSING APPARATUS AND METHOD FOR RECOGNIZING SPECIFIC PATTERN AND RECORDING MEDIUM HAVING IMAGE PROCESSING PROGRAM RECORDED THEREON

(75) Inventors: Akira Murakawa, Toyonaka (JP); Keisuke Hashimoto, Toyokawa (JP)

(73) Assignee: Minolta Co., Ltd., Osaka (JP)

( * ) Notice: Subject to any disclaimer, the term of this patent is extended or adjusted under 35 U.S.C. 154(b) by 0 days.

(21) Appl. No.: 09/538,735

(22) Filed: Mar. 30, 2000

(30) Foreign Application Priority Data

Mar. 31, 1999 (JP) .......................................... 11-092050
Mar. 31, 1999 (JP) .......................................... 11-092094

(51) Int. Cl.[7] ................................................ G06K 9/66
(52) U.S. Cl. .................... 382/195; 382/173; 382/180; 382/190; 382/205; 382/305; 358/403
(58) Field of Search .................. 382/100, 141, 382/151, 159, 173, 176, 180, 181, 190, 194, 195, 199, 204, 205, 260, 291, 305, 306; 235/494; 348/87, 92; 358/403; 707/1–10

(56) References Cited

U.S. PATENT DOCUMENTS

| | | | |
|---|---|---|---|
| 4,334,241 A | * 6/1982 | Kashioka et al. ............. | 348/87 |
| 4,783,838 A | 11/1988 | Matsunawa ................... | 382/271 |
| 5,572,602 A | 11/1996 | Naoi et al. .................... | 382/178 |
| 5,602,940 A | 2/1997 | Inoue et al. .................. | 382/180 |
| 5,625,717 A | 4/1997 | Hashimoto et al. .......... | 382/260 |
| 5,696,838 A | * 12/1997 | Chiu et al. ................... | 382/159 |
| 5,867,593 A | * 2/1999 | Fukuda et al. ............... | 382/176 |
| 6,104,832 A | 8/2000 | Saito et al. .................. | 382/176 |
| 6,302,329 B1 | * 10/2001 | Iwai et al. .................... | 235/494 |
| 6,307,963 B1 | * 10/2001 | Nishida et al. .............. | 382/190 |
| 6,320,977 B1 | * 11/2001 | Tokura ......................... | 382/151 |
| 6,453,069 B1 | * 9/2002 | Matsugu et al. ............. | 382/173 |

* cited by examiner

*Primary Examiner*—Daniel G. Mariam
(74) *Attorney, Agent, or Firm*—Burns, Doane, Swecker & Mathis, LLP

(57) ABSTRACT

The present invention provides an image processing apparatus capable of retrieving a specific pattern from an image at a high speed in an image recognizing processing. The apparatus creates a map image having pixels correspond to block regions of the image by one to one when retrieving a specific pattern from the image. Then, the apparatus labels each pixel of the map image based on feature of each block region of the image, detects a predetermined pattern specifying a region on the map image, specifies a block region on the original image corresponding to a position of the detected predetermined pattern on the map image, and retrieves the specific pattern in the specified block region.

9 Claims, 21 Drawing Sheets

22 MAP IMAGE

22f FILTER FOR MAP IMAGE
(MAP FILTER)

20f FILTER FOR ORIGINAL IMAGE
(IMAGE FILTER)

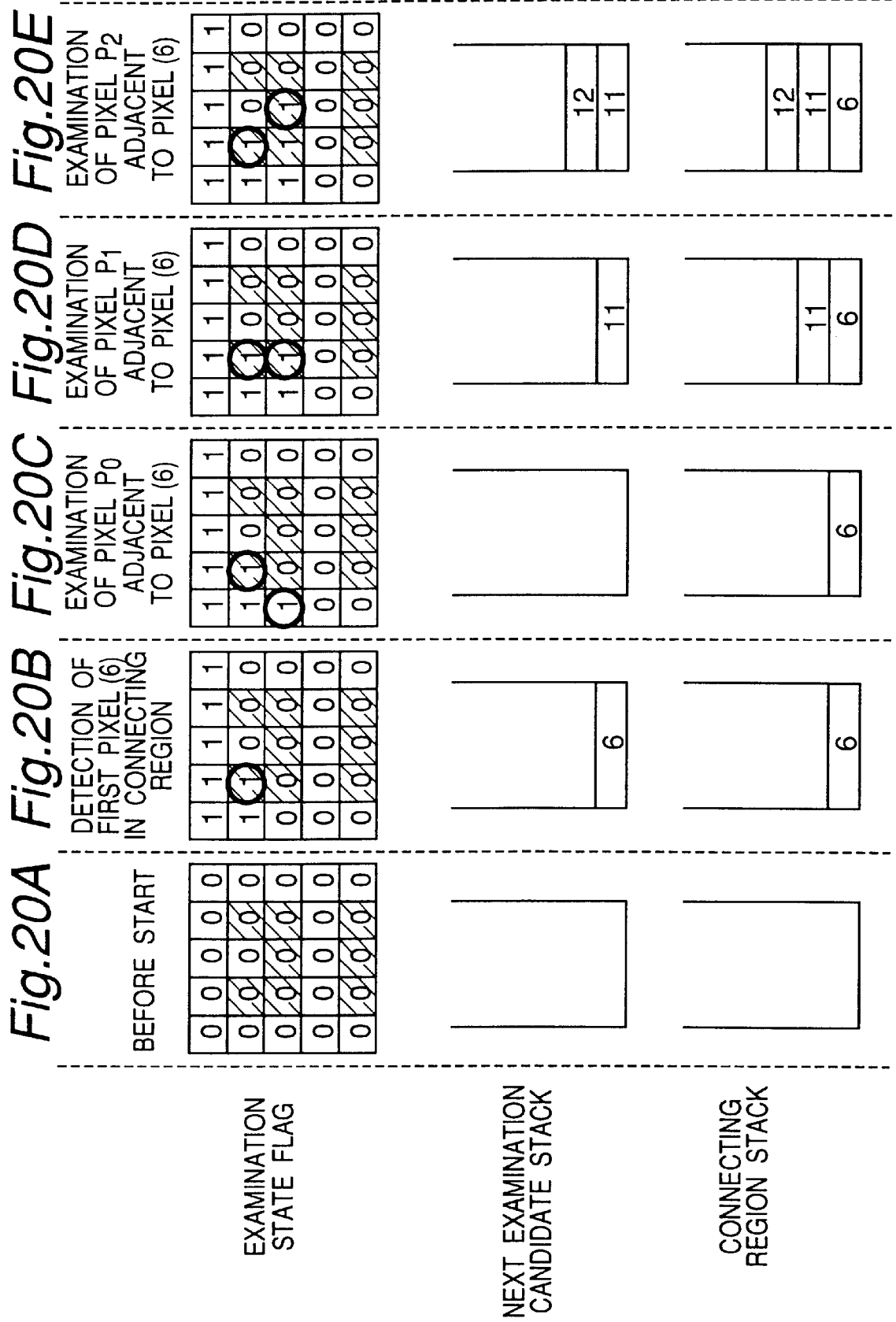

Fig.20F Fig.20G Fig.20H

IMAGE PROCESSING APPARATUS AND METHOD FOR RECOGNIZING SPECIFIC PATTERN AND RECORDING MEDIUM HAVING IMAGE PROCESSING PROGRAM RECORDED THEREON

This application is based on applications Nos. 11-92050 and 11-92094 filed in Japan, the contents of which are incorporated herein by reference.

BACKGROUND OF THE INVENTION

1. Technical Field of the Invention

The present invention relates to an image processing technique for recognizing a specific pattern included in an image.

2. Related Art

Conventionally, in an image processing apparatus, the position of a specific pattern included in an image has been detected and a pattern matching processing has been carried out to recognize the shape of the specific pattern by storing data on each pixel fetched into a camera or the like as binary data or multivalued data in an image memory and matching, for each pixel, the stored data with data on each pixel of a reference pattern stored beforehand in the memory. In this matching, the whole image has been scanned while shifting the reference pattern every pixel for an image including the specific pattern in the x or y direction of the image.

In this method, however, the image including the specific pattern and the reference pattern are shifted and matched every pixel. Therefore, there has been a problem in that a very long time is required for the process.

In the image recognizing process, moreover, examples of a method for detecting the position of the specific pattern of an image implementing a high speed include a method for creating a reduced image from the image, performing a pattern matching on the reduced image to retrieve the specific pattern, and carrying out retrieval in the region of an original image corresponding to the detecting position of the specific pattern on the reduced image again. In this method, however, the specific pattern cannot be detected accurately depending on an algorithm for creating the reduced image in some cases. For example, in the case of the image having a pixel value which is alternately different for each pixel such as checkers, when thinning is carried out every other pixel to create a reduced image, the reduced image thus created has only one of pixel values appearing on an original image. Consequently, a correct specific pattern cannot be detected from such a reduced image.

Moreover, examples of a process to be carried out prior to a process such as image recognition include a labeling process of detecting a region to be formed by pixels having the same value which are continuous in a binary image (hereinafter referred to as a "connecting region") and giving a label number to the connecting region. As a method for the labeling process, various methods have conventionally been proposed.

FIG. 21 is a diagram illustrating one example of the labeling processes in the connecting region of the image according to the prior art. In FIG. 21, an original image 20 includes three connecting regions A, B and C. These connecting regions A, B and C are continuous regions comprising pixels having pixel value of "1". When labeling the connecting region of the image, the whole image is scanned to examine the pixel value of each pixel and to give a provisional label number for a pixel decided to constitute the connecting region. At this time, the provisional label number is not always accurate. Therefore, re-labeling of the label number is carried out later in some cases. For this reason, information for the re-labeling is stored in tables 51 and 53. Then, an image is scanned again to replace the provisional label number with a real label number with reference to the tables 51 and 53.

More specifically, when a pixel having a pixel value of "1" is detected during the scanning of the image 20 in a first scanning operation, it is decided whether or not there are any adjacent pixels having a label number given thereto. If there is an adjacent pixel having a label given thereto, the same label number as in the adjacent pixel is given to the detected pixel. When a plurality of adjacent pixels have the label numbers given thereto, the same label number as in the adjacent pixel having a higher priority is given based on a predetermined priority. When there is no adjacent pixel having the label number given thereto, a new label number is given to the detected pixel. Thus, the inside of the image is scanned to give the label number of the pixel having the pixel number of "1".

As described above, in the image having the label number given thereto, pixels having the same label number given thereto form one connecting region. However, a plurality of label numbers are given to one connecting region depending on the shape of the connecting region in some cases. As shown in FIG. 21, for example, a connecting region A of the image 20 is labeled as three regions having label numbers 2, 3 and 4 in an image 20' as a result of the above-mentioned labeling. In the labeling process, a link table 51 is created. The link table 51 stores information indicating that three regions having the label numbers 2, 3 and 4 are identical. Furthermore, label editing is carried out to create a conversion table 53 for setting the label numbers 2, 3 and 4 to 2 and re-labeling the label numbers 3 and 4 thus generating a vacancy into a region having label numbers 5 and 6.

Then, in a second scanning operation, each of the pixels of the image 20' is scanned and a label number is converted (re-labeled) into a real label number by referring to the information of the conversion table 53. Consequently, each region is finally labeled correctly as in an image 20".

In the above-mentioned method, however, it is necessary to scan the whole image twice. Therefore, a long time is taken to perform the labeling process. The time required for the processing is prolonged as the size of the image is increased.

SUMMARY OF THE INVENTION

The present invention is directed to solve the above-mentioned problem, and has an object to provide an image processing apparatus and method capable of retrieving a specific pattern from an image at a high speed and a recording medium storing a program therefor.

The invention has another object to provide an image processing apparatus and method for a labeling processing in the connecting region of an image at a high speed, and a recording medium storing a program therefor.

In a first aspect of the invention, an image processing apparatus is provided for retrieving a specific pattern of an image. The apparatus comprises a unit for dividing the image into a plurality of block regions, each of the block regions having a predetermined size, a unit for creating a map image comprising a plurality of pixels, each of the pixels corresponding to one of the block regions by one to one, a unit for extracting features of the image for each of the block regions, a unit for deciding whether or not the extracted feature meets a predetermined condition, a unit for labeling the pixel on the map image based on a result of the decision, the pixel corresponding to the block region of which feature meets the condition, a unit for detecting a predetermined pattern for specifying a search region on the image from the labeled map image, a unit for specifying the search region based on a position on the map image in which the predetermined pattern is detected, and a unit for retrieving the specific pattern in the specified search region on the image.

In the apparatus, at least one of a concentration value of a pixel, an edge amount and a co-occurrence characteristic may be extracted as the feature amount. In the apparatus, the predetermined pattern for determining the search region may be detected by using a filter having the same size as a size of the specific pattern in the map image.

In a second aspect of the invention, an image processing method is provided for retrieving a specific pattern of an image. The method comprises dividing the image into a plurality of block regions, each of the block regions having a predetermined size, creating a map image comprising a plurality of pixels, each of the pixels corresponding to one of the block regions by one to one, extracting features of the image for each of the block regions, deciding whether or not the extracted feature meets a predetermined condition, labeling the pixel on the map image based on a result of the decision, the pixel corresponding to the block region of which feature meets the condition, detecting a predetermined pattern for specifying a search region on the image from the labeled map image, specifying the search region based on a position on the map image in which the predetermined pattern is detected, and retrieving the specific pattern in the specified search region on the image.

In a third aspect of the invention, a computer readable recording medium storing a program for controlling the computer to retrieve a specific pattern from an image is provided. The program is capable of executing the following functions: a function for dividing the image into a plurality of block regions, each of the block regions having a predetermined size; a function for creating a map image comprising a plurality of pixels, each of the pixels corresponding to one of the block regions by one to one; a function for extracting features of the image for each of the block regions; a function for deciding whether or not the extracted feature meets a predetermined condition; a function for labeling the pixel on the map image based on a result of the decision, the pixel corresponding to the block region of which feature meets the condition; a function for detecting a predetermined pattern for specifying a search region on the image from the labeled map image; a function for specifying the search region based on a position on the map image in which the predetermined pattern is detected; and a function for retrieving the specific pattern in the specified search region on the image.

In a fourth aspect of the invention, an image processing apparatus is provided for labeling a connecting region of an image. The apparatus comprises a flag memory including flags indicating whether or not each pixel of the image is finished with examination, a candidate stack for storing indexes, each of indexes specifying a pixel of which adjacent pixels are to be examined, a region memory for storing indexes, each of indexes indicating one of pixels constituting the connecting region, a labeling unit for labeling pixels specified by the indexes stored in the region memory, and a connecting region detecting unit for detecting the pixels constituting the connecting region. The connecting region detecting unit scans the image, examines whether or not a pixel of the image constitutes the connecting region, sets the flag for the examined pixel. When the pixel constituting the connecting region is first detected in the examination, the connecting region detecting unit (1) pushes an index of the detected pixel into the candidate stack, and stores the index to the region memory, 2) while there is at least one index stored in the candidate stack, repeats a) popping an index from the candidate stack to examine whether or not pixels adjacent to a pixel which is indicated by the popped index and of which flag indicates unexamined constitute the connecting region, b) when the adjacent pixels constitute the connecting region, pushing the indexes of the adjacent pixels into the candidate stack and storing the indexes to the region memory, and c) setting the flags for the adjacent pixels.

In the apparatus, the labeling unit may calculate a size of a region including pixels indicated by indexes stored in the memory when labeling pixels, and prohibit labeling the pixel when the calculated size is out of a predetermined range. In the apparatus, the region memory may comprise a stack memory.

In a fifth aspect of the invention, an image processing method is provided for labeling a connecting region of an image. The method comprises scanning the image, examining whether or not a pixel of the image constitutes the connecting region, setting the flag for the examined pixel, and when the pixel constituting the connecting region is first detected in the examination, (1) pushing an index of the detected pixel into a stack, and storing the index to a memory, (2) while there is at least one index stored in the stack, repeating a) popping an index from the stack to examine whether or not pixels adjacent to a pixel which is indicated by the popped index and of which flag indicates unexamined constitute the connecting region, b) when the adjacent pixels constitute the connecting region, pushing the indexes of the adjacent pixels into the stack and storing the indexes to the memory, and c) setting the flags for the adjacent pixels, (3) reading all indexes out from the memory when there is no index stored in the stack to label pixels indicated by the read indexes with same number.

In a sixth aspect of the invention, a computer readable recording medium in which a program for controlling the computer to label a connecting region of an image is provided. The program is capable of executing the following functions: a function for scanning the image; a function for examining whether or not a pixel of the image constitutes the connecting region; a function for setting the flag for the examined pixel; and when the pixel constituting the connecting region is first detected in the examination, (1) a function for pushing an index of the detected pixel into a stack, and storing the index to a memory, (2) while there is at least one index stored in the stack, repeating a) a function for popping an index from the stack to examine whether or not pixels adjacent to a pixel which is indicated by the popped index and of which flag indicates unexamined constitute the connecting region, b) when the adjacent pixels constitute the connecting region, a function for pushing the indexes of the adjacent pixels into the stack and storing the indexes to the memory, and c) a function for setting the flags for the adjacent pixels, (3) a function for reading all indexes out from the memory when there is no index stored in the stack to label pixels indicated by the read indexes with same number.

This object as well as other objects, features and advantages of the invention will become more apparent to those skilled in the art from the following description with reference to the accompanying drawings.

BRIEF DESCRIPTION OF THE DRAWINGS

FIGS. 20A to 20H are diagrams illustrating a transition of the state of the examination-end flag, the next examination candidate stack and the connecting region stack.

DETAILED DESCRIPTION OF THE INVENTION

An image processing apparatus according to preferred embodiments of the present invention will be described in detail with reference to the accompanying drawings.

First Embodiment

An image processing apparatus according to the present embodiment serves to retrieve a specific pattern in an image.
(Structure of Image Processing Apparatus)

Figure 1:
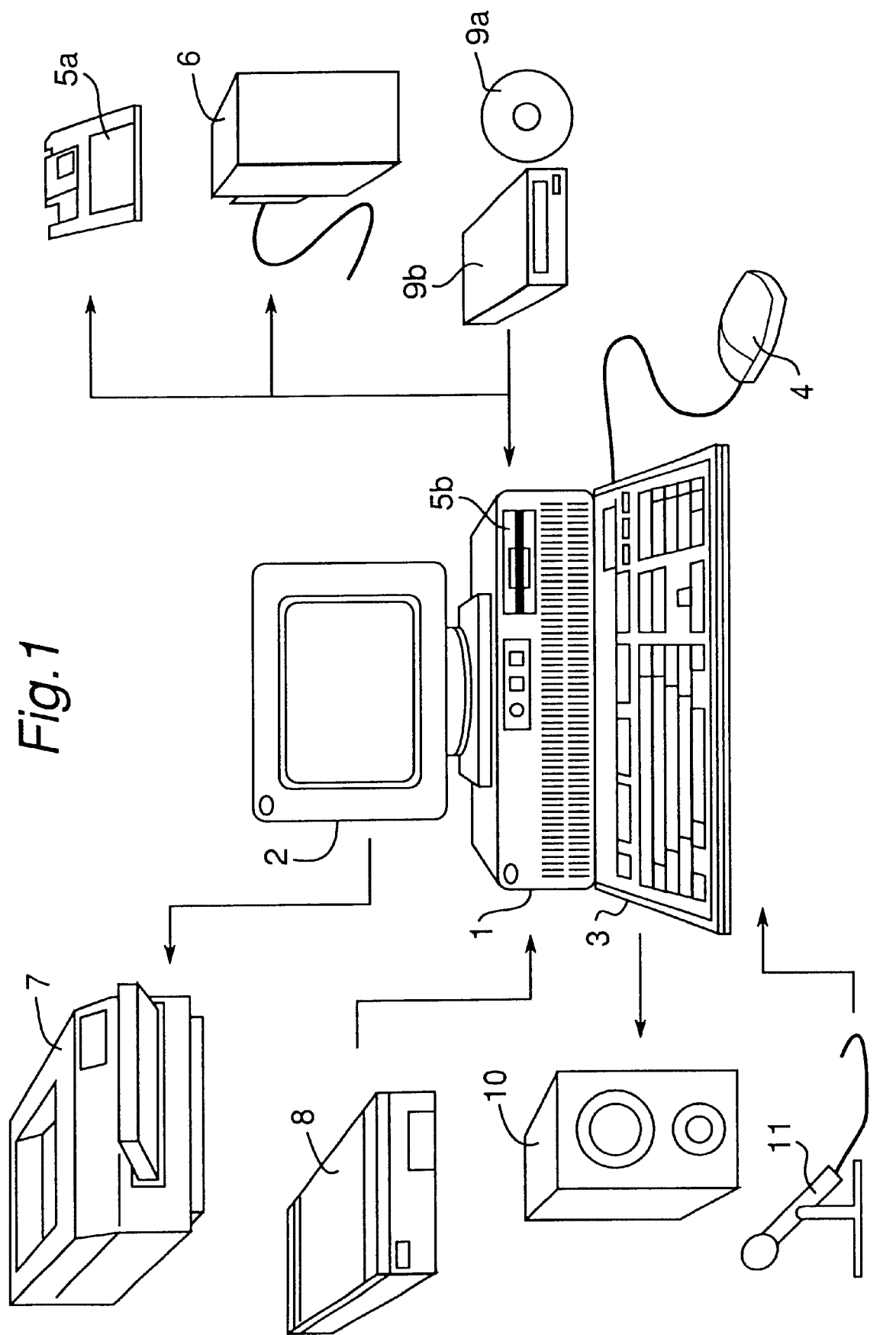
FIG. 1 is a diagram schematically showing the structure of an image processing apparatus according to the present invention.

FIG. 1 is a diagram showing the schematic structure of an image processing apparatus according to the present embodiment (which will be hereinafter referred to as a "system"). As shown in FIG. 1, the system comprises a central processing unit (which will be hereinafter referred to as a "CPU"), and is mainly constituted by a controller 1 for controlling the whole system. For example, Pentium manufactured by Intel Co., Ltd. or the like is used for the CPU. To the controller 1 are connected a display 2 for performing the display of images, characters or the like, the display for operations and the like, a keyboard 3 and a mouse 4 for carrying out various inputs, indicating operations and the like, a floppy disk drive 5a and a hard disk drive 6 which are data saving media, a printer 7 for printing characters, image data and the like, a scanner 8 for fetching image data, a CD-ROM drive 9b for reading data stored in a CD-ROM 9a, a speaker 10 for outputting a voice, and a microphone 11 for inputting a voice.

Figure 2:
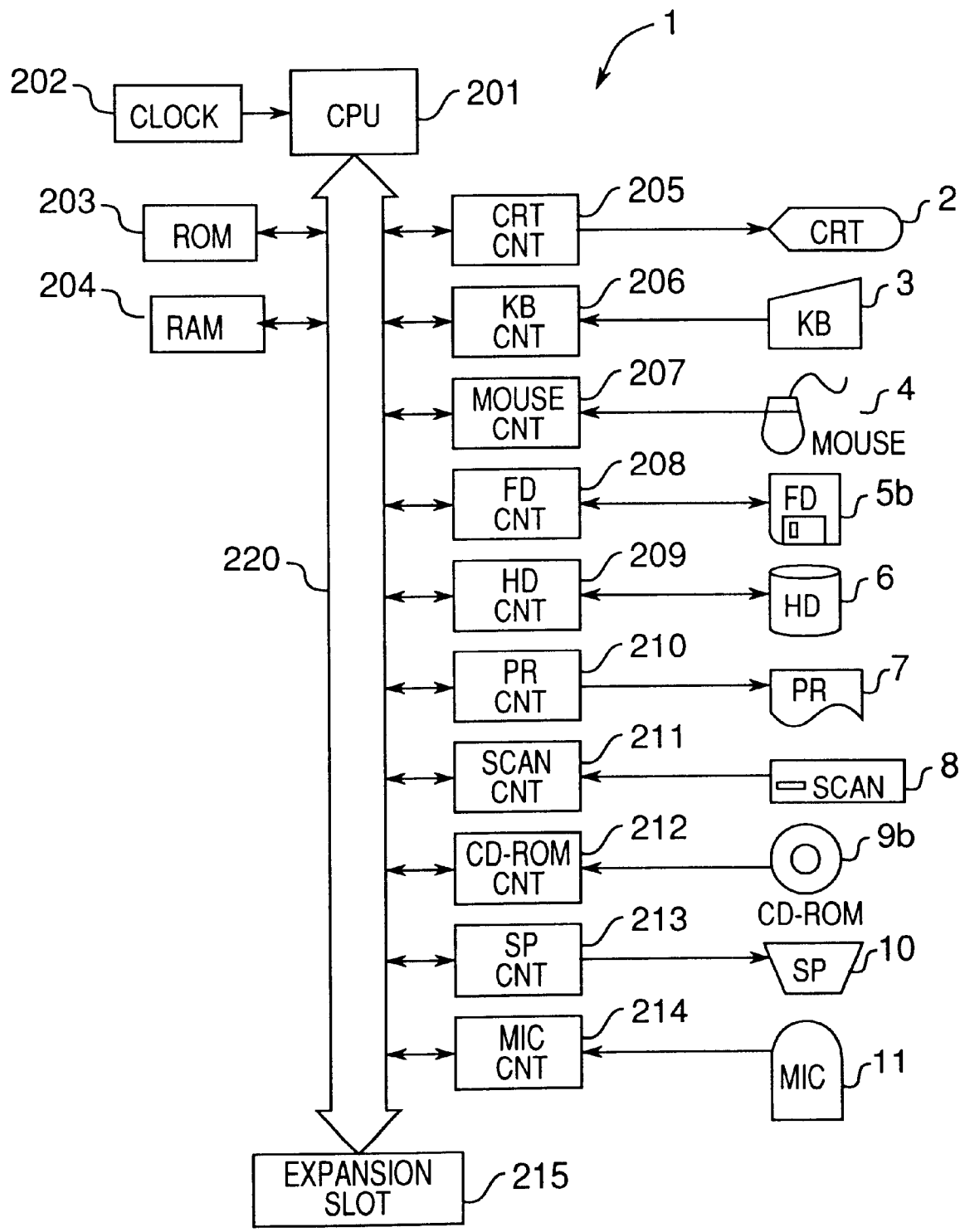
FIG. 2 is a block diagram of the image processing apparatus, mainly showing a controller.

FIG. 2 is a block diagram showing the present is system. A ROM 203 in which a program for controlling the system is stored and a RAM 204 for temporarily storing a program and data to be executed for control by the CPU 201 are connected to the CPU 201 through a data bus 220. Moreover, a circuit to be connected to the CPU 201 through the data bus 220 includes a display control circuit 205 for controlling the display 2 for displaying images, characters or the like, a keyboard control circuit 206 for transferring and controlling an input from the keyboard 3, a mouse control circuit 207 for transferring and controlling an input from the mouse 4, a floppy disk drive control circuit 208 for controlling the floppy disk drive 5b, a hard disk drive control circuit 209 for controlling the hard disk drive 6, a printer control circuit 210 for controlling an output to the printer 7, a scanner control circuit 211 for controlling the scanner 8, a CD-ROM drive control circuit 212 for controlling the CD-ROM drive 9b, a speaker control circuit 213 for controlling the speaker 10, and a microphone control circuit 214 for controlling the microphone 11. Furthermore, a clock 202 for generating a reference clock necessary for operating the system is connected to the CPU 201, and an expansion slot 215 for connecting various extension boards is connected to the CPU 201 through the data bus 220. A SCSII board is connected to the expansion slot 215, and the floppy disk unit 5b, the hard disk drive 6, the scanner 8, the CD-ROM drive 9b or the like may be connected through the SCSII board.

While the floppy disk drive 5a and the hard disk drive 6 have been used as the data storage media in the above-mentioned system, other information recording media such as a magneto-optic disk (MO) and the like may be used. Moreover, while the scanner 8 is used as the image data input device, other data input devices such as a steel video camera, a digital camera and the like may be used. Furthermore, while the printer 7 has been used as an output device, other output devices such as a digital printer may be used. In the present system, moreover, a program for implementing a data management system is stored in the ROM 203. However, a part of or all the programs may be stored in the information recording media such as the floppy disk drive 5a, the hard disk drive 6, the CD-ROM drive 9b and the like, and a program and data may be read out from the information recording media to the RAM 204 if necessary and may be executed.

(Main Routine)

Figure 3:
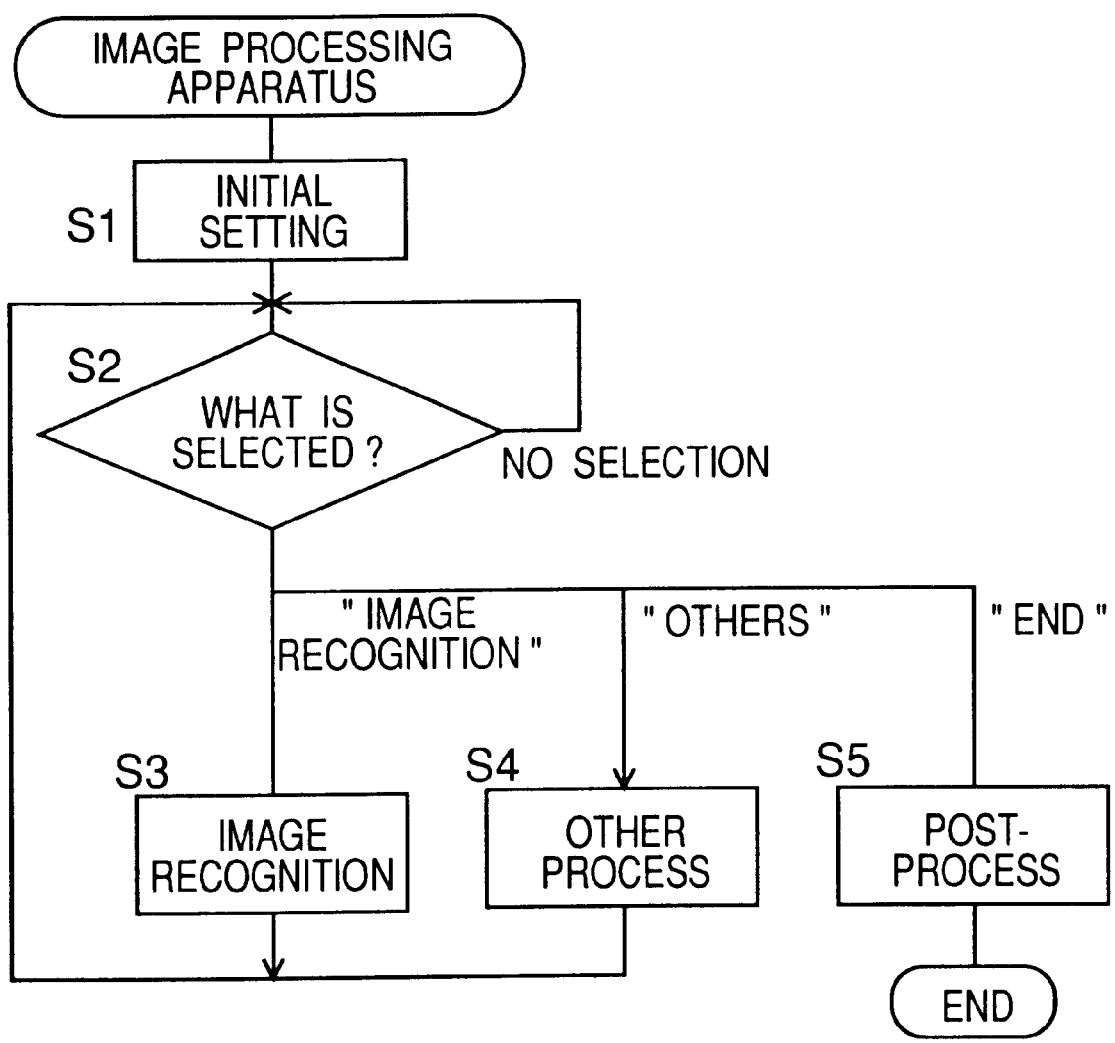
FIG. 3 is a flowchart showing a main routine in the image processing apparatus according to a first embodiment.

FIG. 3 is a flowchart showing a main routine of a program to be executed by the CPU 201 in the system. The system (CPU 201) sequentially executes each process according to user's operation.

When the program is started, first of all, an initializing process for initializing a flag or the like necessary for each of the subsequent process and for displaying an initial menu screen and the like is carried out (S1). Icons for selecting a process such as "IMAGE RECOGNITION" "OTHERS" and the likes are displayed on an initial menu screen. When the user selects one of the icons, a process corresponding to the icon is executed. Next, it is decided whether or not any process is selected by the user on the initial menu screen (S2). If the "IMAGE RECOGNITION" is selected at the step S2, the routine proceeds to an image recognizing process (S3) for performing a process of confirming the presence of a pattern having a specific layout (referred to as "layout pattern") in an input image. Then, the routine returns to the step S2. At the step S2, "OTHERS" is selected, another process (S4) which is a predetermined process other than the image recognition is carried out. Then, the routine returns to the step S2. At the step S2, "END" is selected, a predetermined post-process (S5) for terminating the operation of the system is carried out to end the control. If nothing is selected at the step S2, the user's selection of any of the process is waited.

Since another process (step S4) and a post-process (step S5) are basically the same as well-known process to be used in a general information processing system, their description will be omitted. The image recognition process (step S3) will be described later in detail.

(Image Recognition Process)

Figure 4:
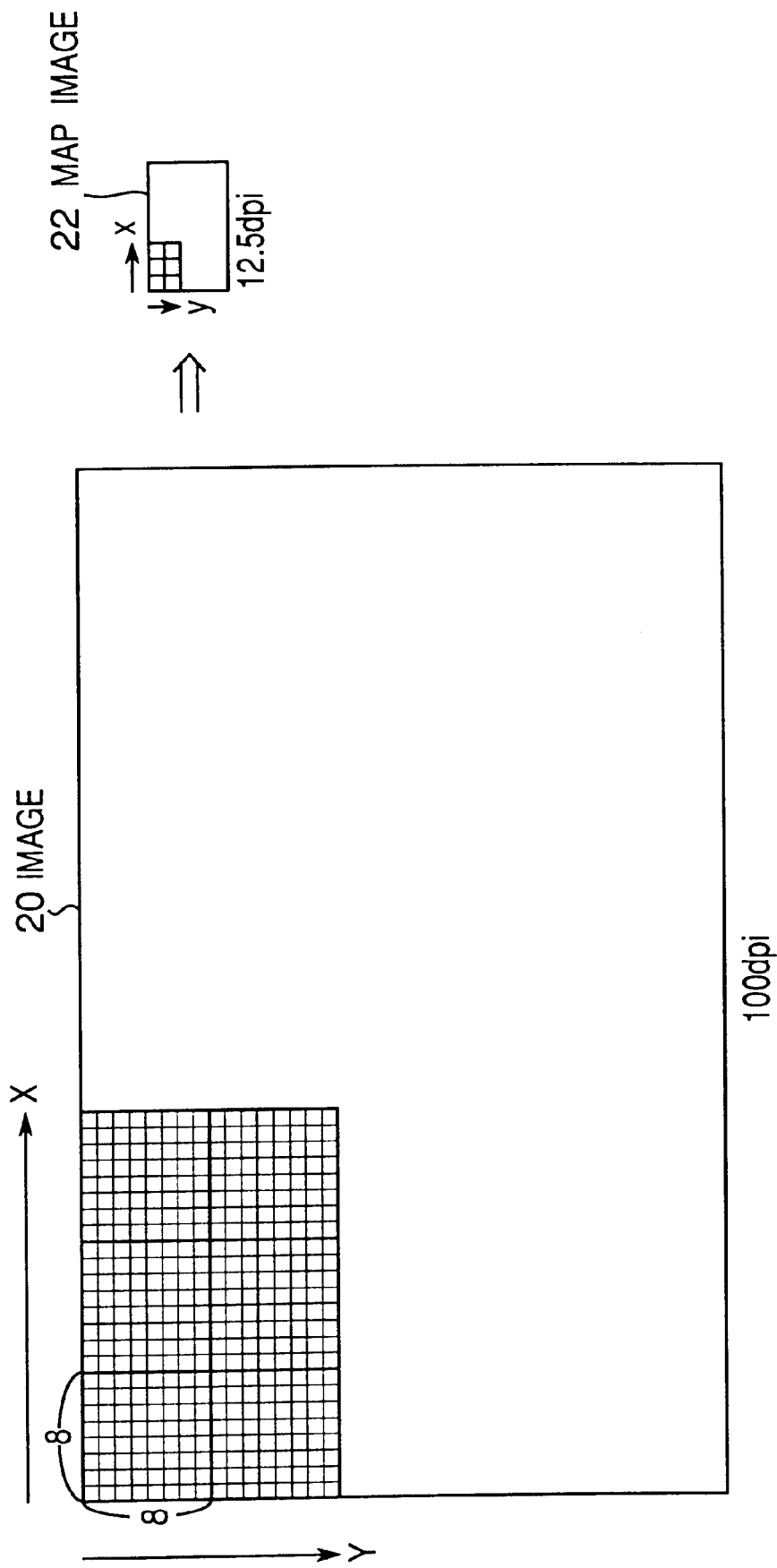
FIG. 4 is a diagram showing an object image (an original image) from which a specific pattern is retrieved and a map image corresponding thereto.

The summary of the image recognition process of the system will be described below with reference to FIG. 4. In the image recognition process, when a specific pattern is retrieved in the image 20 to be retrieved, used is a map image 22 which is an image indicative of a region in the image 20 having feature that is coincide exactly or approximately with a part of or whole specific patterns. The map image 22 is created such that one pixel corresponds to one block obtained by dividing the whole region of the image 20 into some block regions having a predetermined size (8×8 pixels). Accordingly, the size of the map image 22 is an eighth of the original image 20 in the x and y directions in FIG. 4. The system uses the map image 22 to retrieve the specific pattern in the following manner. The system extracts a feature of the image 20 for each block region, examines the feature for each block region and records the result on the pixel of the map image 22 corresponding to the block region of the image 20 (labeling). Then, the system presumes a region where the specific pattern on the image 20 is present based on the pixel pattern formed by the labeling on the map image 22, and examines the presumed region on the image 20 in detail, thereby retrieving the specific pattern. Thus, specifying the retrieval region by using the map 22 having a small size reduces a processing time required for specifying the retrieval region. Therefore the specific pattern retrieval can be carried out at a high speed. This process will be described below with reference to a flowchart shown in FIG. 5.

Figure 5:
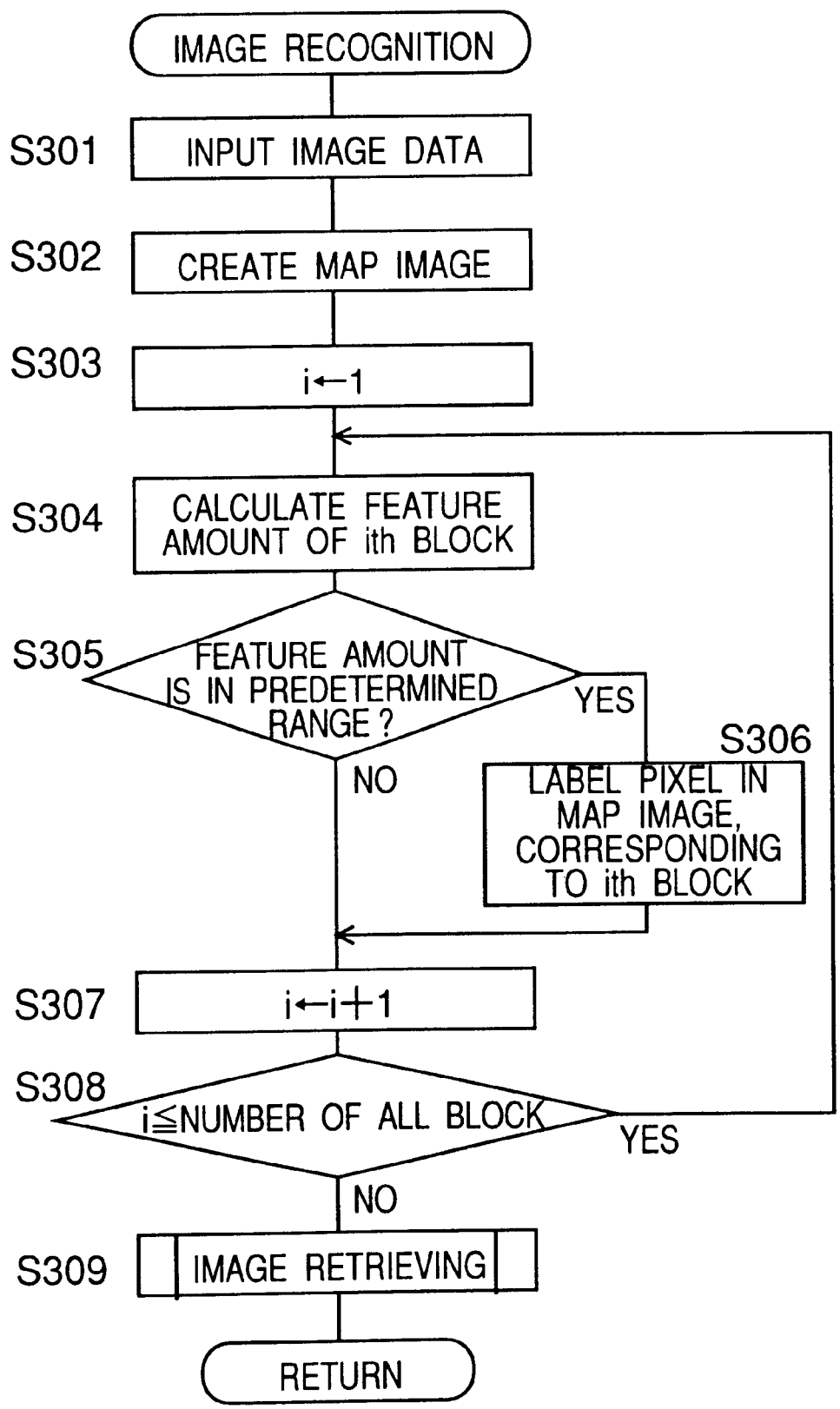
FIG. 5 is a flowchart showing an image (pattern) recognition process.

As shown in FIG. 5, when the present process is started, image data of the image 20 is input (S301). The image 20 is an object to be retrieved with the specific pattern. More specifically, the image data of the image 20 designated by the user is loaded into the RAM 204. The input image 20 is divided into some block regions each having a predetermined size. The block size can be set to an optional size (m×n pixels). Next, the map image 22 is created (S302). More specifically, a working region on the RAM 204 for the map image 22 is kept and all the pixel values of the map image 22 are initialized to a constant value. When the size of the original image is set to Sx pixels×Sy pixels, (Sx/m) pixels×(Sy/n) pixels is obtained as the size of the map image. In the following, the block size of 8 pixels×8 pixels will be described.

Next, a pointer i indicative of a block region to be processed is set to 1 (S303). The feature of the image is calculated for the ith block region indicated by the pointer i (S304). The feature of the ith block region is obtained in the following manner. The feature is obtained for each pixel in the block region, and the pixel is labeled when the amount of feature is within a predetermined range. Then, the number of the labeled pixels in the block region is counted as the feature amount in the block. The feature includes a) the number of pixels within a specific range in a color space, b) the strength of an edge, c) the co-occurrence characteristic obtained by conversion to a binary image and the like. These features will be described simply.

a) Number of Pixels Within Specific Range in Color Space

When a specific pattern is constituted by a single color and has a uniform density within some error (difference) range for a block size, a pixel in a block region which has the same color as the specific pattern is labeled. In the block region, the labeled pixels are counted and the number thereof is set as the feature amount of the block region. At this time, a block region having the feature amount within a predetermined error range can be a candidate region in which the specific pattern is to be searched.

b) Strength of Edge

In the case where the specific pattern has an edge which is uniform within a certain error range for the block size, by scanning the image in the block region with an edge extracting filter, the sum of all numeric values is calculated to obtain the feature amount (edge amount) of the block region. A block having the feature amount within a predetermined error range can be a candidate region in which the specific pattern is searched. The edge extracting filter is, for example, a Laplacian filter.

c) Co-occurrence Characteristic Obtained by Conversion to Binary Image

When the specific pattern has a uniform co-occurrence characteristic within a certain error range for the block size, the image in the block region is converted into a binary image with a certain threshold, and then the co-occurrence characteristic of each pixel with the adjacent pixel is set to the feature amount. The co-occurrence characteristic represents a degree of gathering of the pixels having the same pixel value and indicates a probability that a certain pixel has the same pixel value as the value of a pixel adjacent thereto. A high co-occurrence characteristic implies that the pixels having the same value are densely present, while a low co-occurrence characteristic implies that the pixels having the same value are coarsely present.

Returning to FIG. 5, the feature amount of the ith block region is calculated (S304). Then, it is decided whether or not the feature amount is within a predetermined range, that is, the character amount is OK (S305). The predetermined range is set such that image in the same block region can be determined to be equivalent to a part of or whole of the pattern based on the calculated feature amount. When the feature amount is within a predetermined range, a pixel on the map image 22 corresponding to the ith block region is labeled (S306). When the feature amount is out of the predetermined range, the step S306 is skipped. Then, the pointer i is incremented (S307). It is decided whether or not the pointer i exceeds the number of all the block regions (S308), the routine returns to a step S304 when the pointer i does not exceed the number of all the block regions, and the above-mentioned process (S304 to S308) are repeated until all the process are ended for extraction and decision of the feature amount and the like for all the block region on the image 20. When those process for all the block region on the image 20 are ended, a process for retrieving a specific pattern is carried out by using the map image 22 (S309), and the routine then returns.

Next, the retrieving process of the image (step S309) will be described. In the process, a region on the image 20 where a specific pattern might be present is presumed by using the map image 22 labeled based on the feature amount of the image 20, and a specific pattern is retrieved for the presumed region on the image 20.

Figure 6:
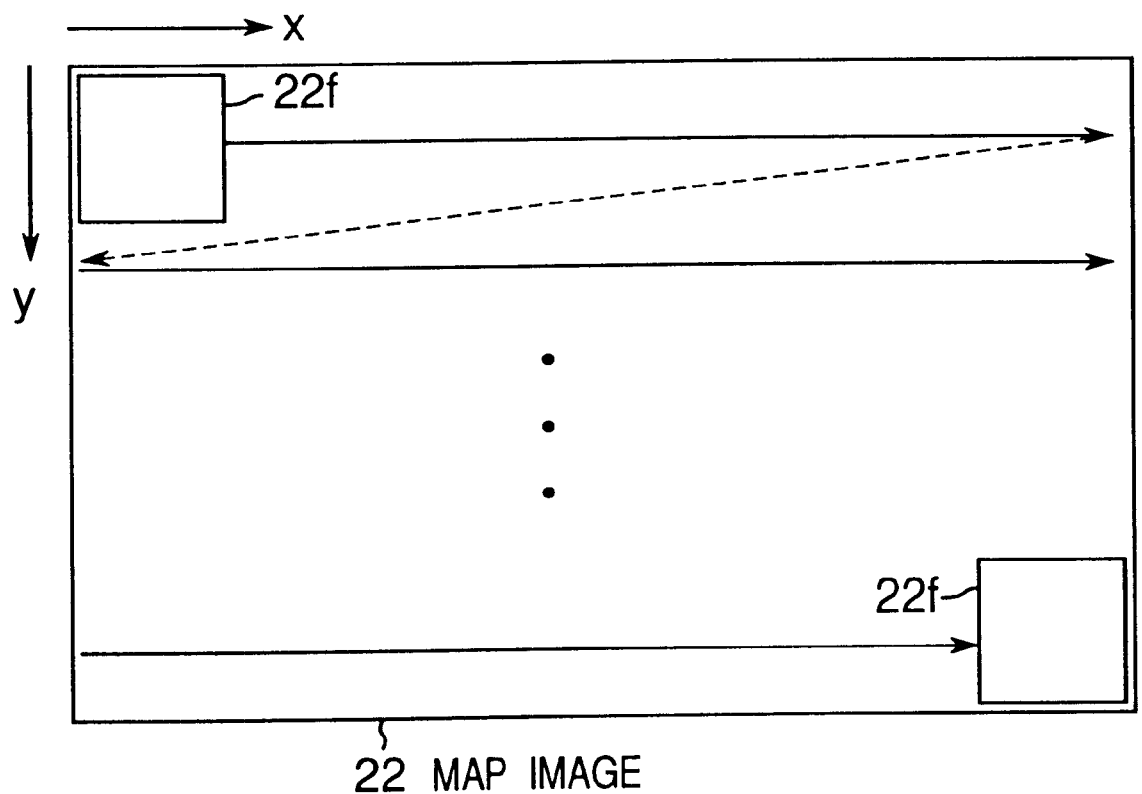
FIG. 6 is a diagram illustrating the scanning by a map filter on a map image.

The region on the map image 22 is presumed in the following manner. The map image 22 labeled based on the feature amount of the image 20 is scanned by using a filter (hereinafter referred to as a "map filter") for recognizing the predetermined pattern (hereinafter referred to as a "region specifying pattern") for specifying a region, and the region specifying pattern is retrieved from the map image 22. More specifically, the map image 22 is scanned by using a map filter 22f as shown in FIG. 6. When the region specifying pattern is found on the map image 22, a specific pattern is retrieved by using a filter (hereinafter referred to as an "image filter") for recognizing a specific pattern in a region on the original image 20 corresponding to a position on the map image 22 where the region specifying pattern is detected.

Figure 7:
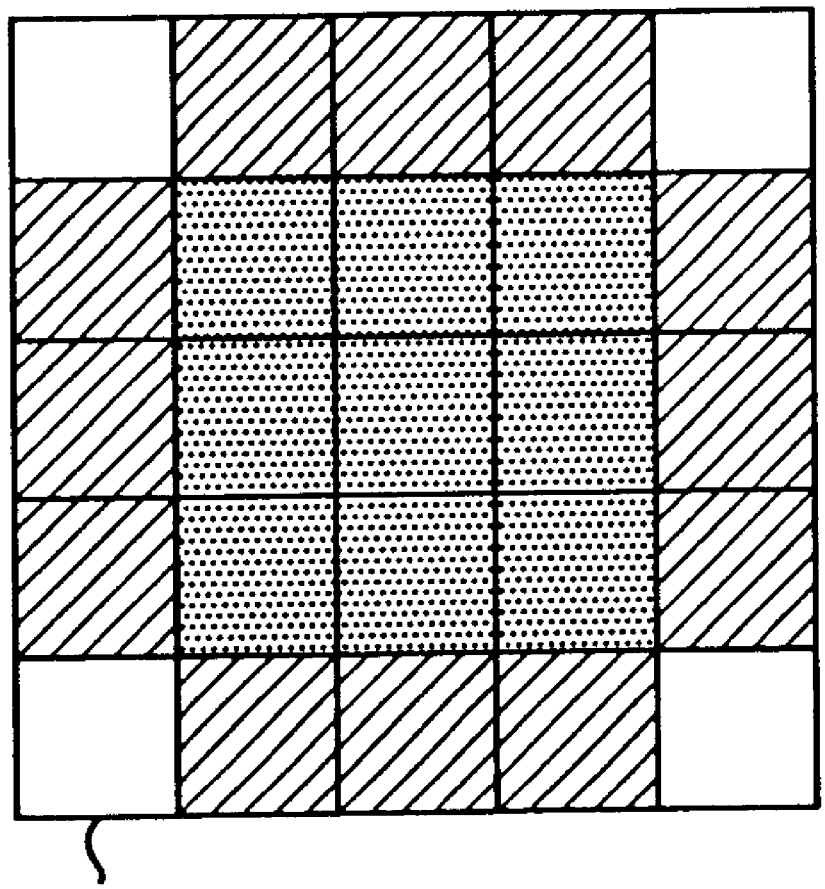
FIG. 7 is a diagram showing an example of the map filter.
Figure 8:
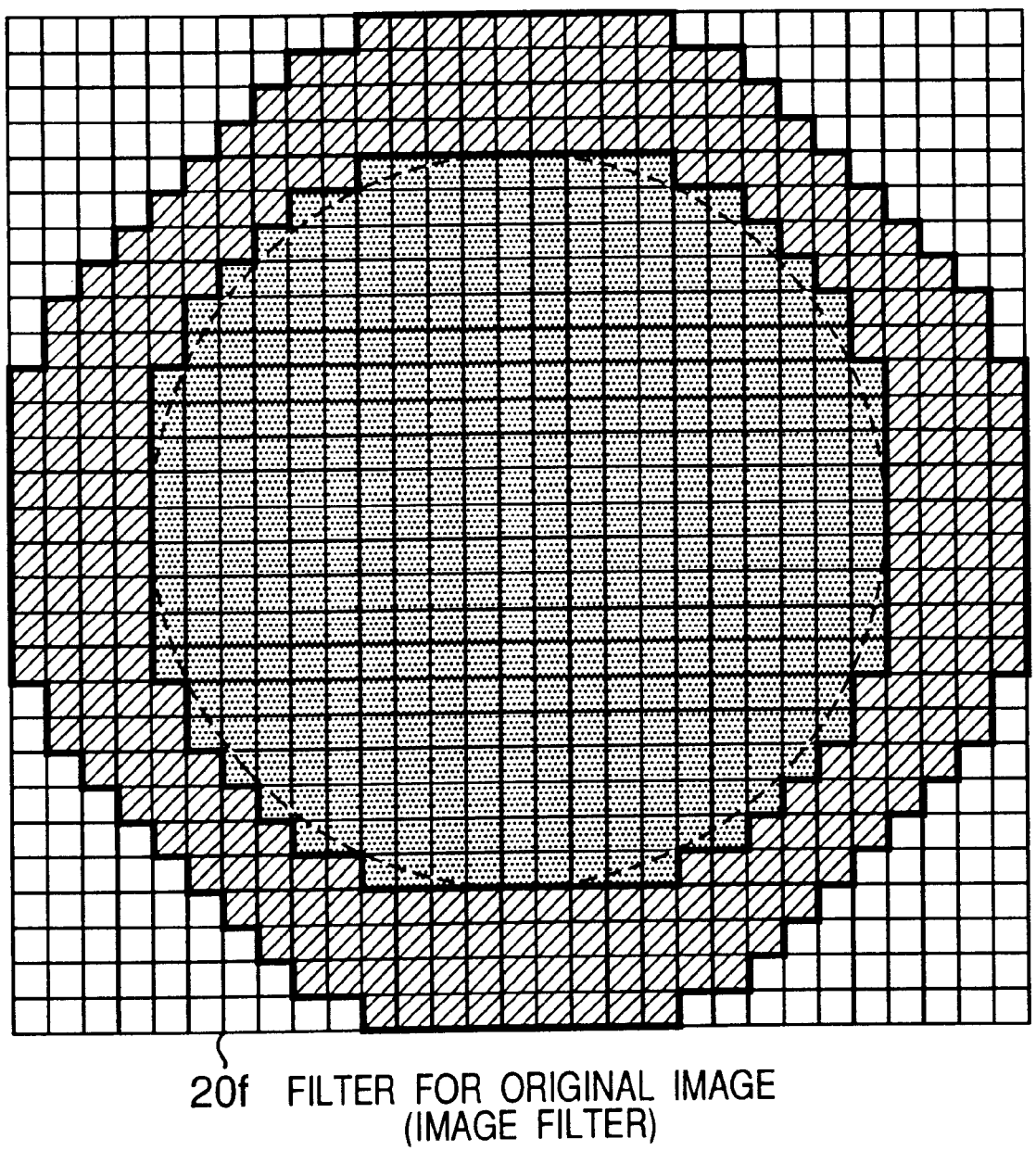
FIG. 8 is a diagram showing an example of an image filter.

FIG. 7 shows an example of the map filter 22f and FIG. 8 shows an example of the image filter 20f. Each of these filters 22f and 20f has a central portion (a region hatched with a dot in the drawing) and a peripheral portion of the central portion (a region hatched with a slant line in the drawing). It is preferable that each filter 20f or 22f has size equal to the size of the specific pattern to be retrieved. In the following description, a position on an upper left end in each of the filters 20f and 22f is set to the position of the filter. In the present embodiment, moreover, a circular pattern is used as an example of the specific pattern to be recognized and detected.

Figure 9:
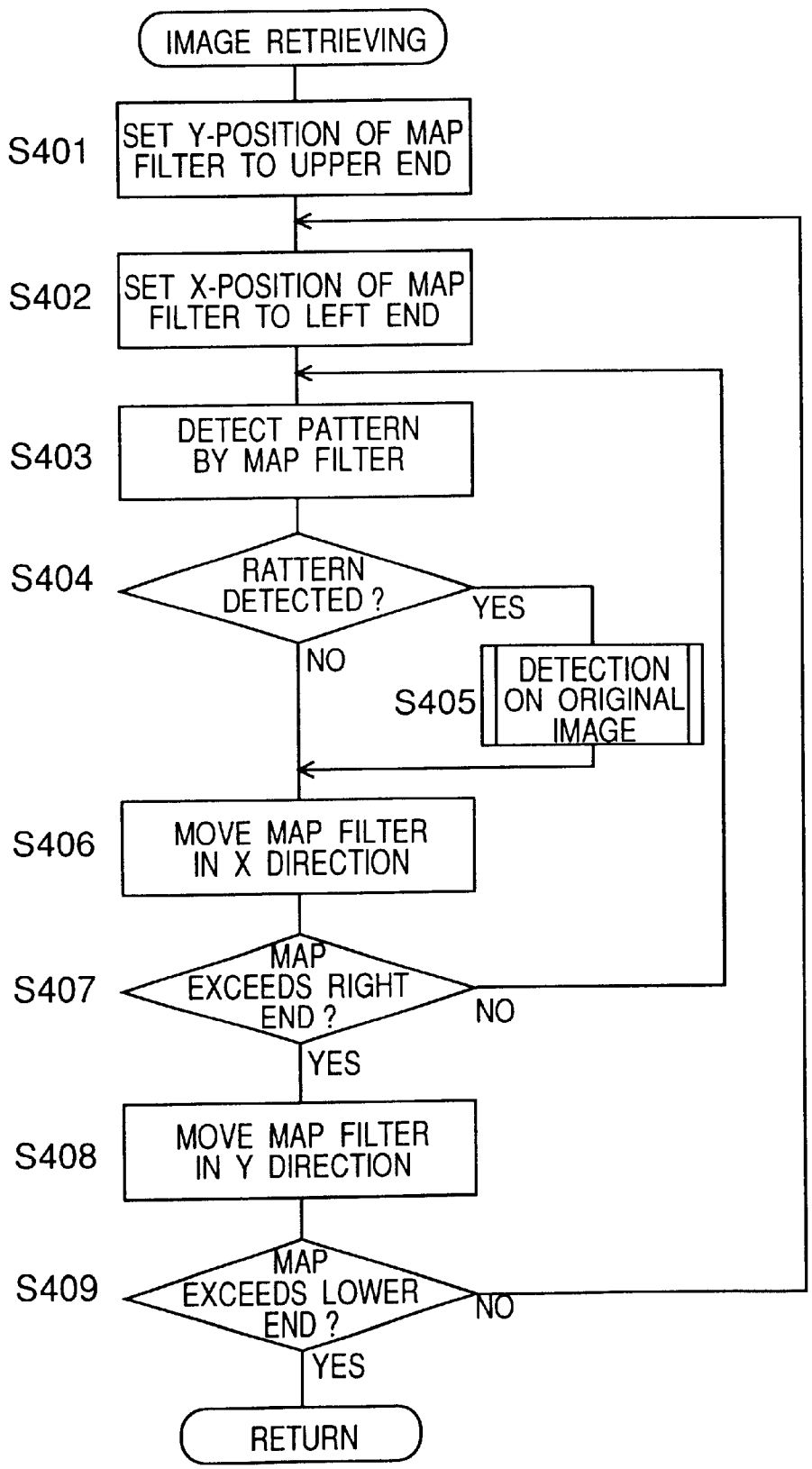
FIG. 9 is a flowchart showing the detecting process on an image.

The process of retrieving an image (step S309) will be described with reference to a flowchart shown in FIG. 9. In the present process, the position of the scanning start of the map filter 22f is first determined. More specifically, the coordinates in the y direction of the map filter 22f are set to be positioned on the upper end of the map image 22 (S401), and coordinates in the x direction of the map filter 22f are set to be positioned on the left end of the map image 22 (S402).

When the coordinates of the map filter 22f are set, a pattern is detected by using the map filter 22f in that position (S403). Concretely, counted are the numbers of pixels labeled in the central portion of the map filter 22f and the peripheral portion of the central portion (which will be hereinafter referred to as a "peripheral portion") shown in FIG. 7, respectively. A region specifying pattern is determined to be detected when the number (M) counted in the central portion of the map filter 22f is within a predetermined range of the central portion and the number (N) counted in the peripheral portion is within a predetermined range of the peripheral portion. For example, when the number (M) counted in the central portion of the map filter 22f is 8 or more and there is no count in the peripheral portion, that is, M>7 and N=0, the region specifying pattern may be decided to be detected or found. The predetermined ranges for the respective count numbers of M and N are properly set according to the retrieval precision of the map filter 22f. When the region specifying pattern is detected, a detection position thereof is set to the coordinates on the upper left end of the map filter 22f.

As a result of the detection in the above-mentioned manner, when the region specifying pattern is detected, a specific pattern is detected in a region on the original image 20 which corresponds to the detection position of the region specifying pattern (S405). This process will be described below in detail. When no region specifying pattern is detected, the step S405 is skipped.

Then, the map filter 22f is moved by a predetermined amount (for example, one pixel) in the x direction (S406). It is decided whether or not the right end of the map filter 22f gets over the right end of the map image 22, that is, the map filter 22f gets out of the right end of the map image 22 (S407). When the map filter 22f does not get out of the map image 22, the routine returns to S403 where a region specifying pattern is detected in a new position. When the map filter 22f gets out of the map image 22, the map filter 22f is moved by a predetermined amount (for example, one line) in the y direction (S408). It is decided whether or not the lower end of the map filter 22f gets over the lower end of the map image 22, that is, the map filter 22f gets out of the map image 22 (S409). When the map filter 22f does not get out of the map image 22, the routine returns to the step S402 where the region specifying pattern is detected in a new position. Thus, the above-mentioned processes (S402 to S409) are repeated until the whole map image 22 is scanned by the map filter 22f.

Figure 10:
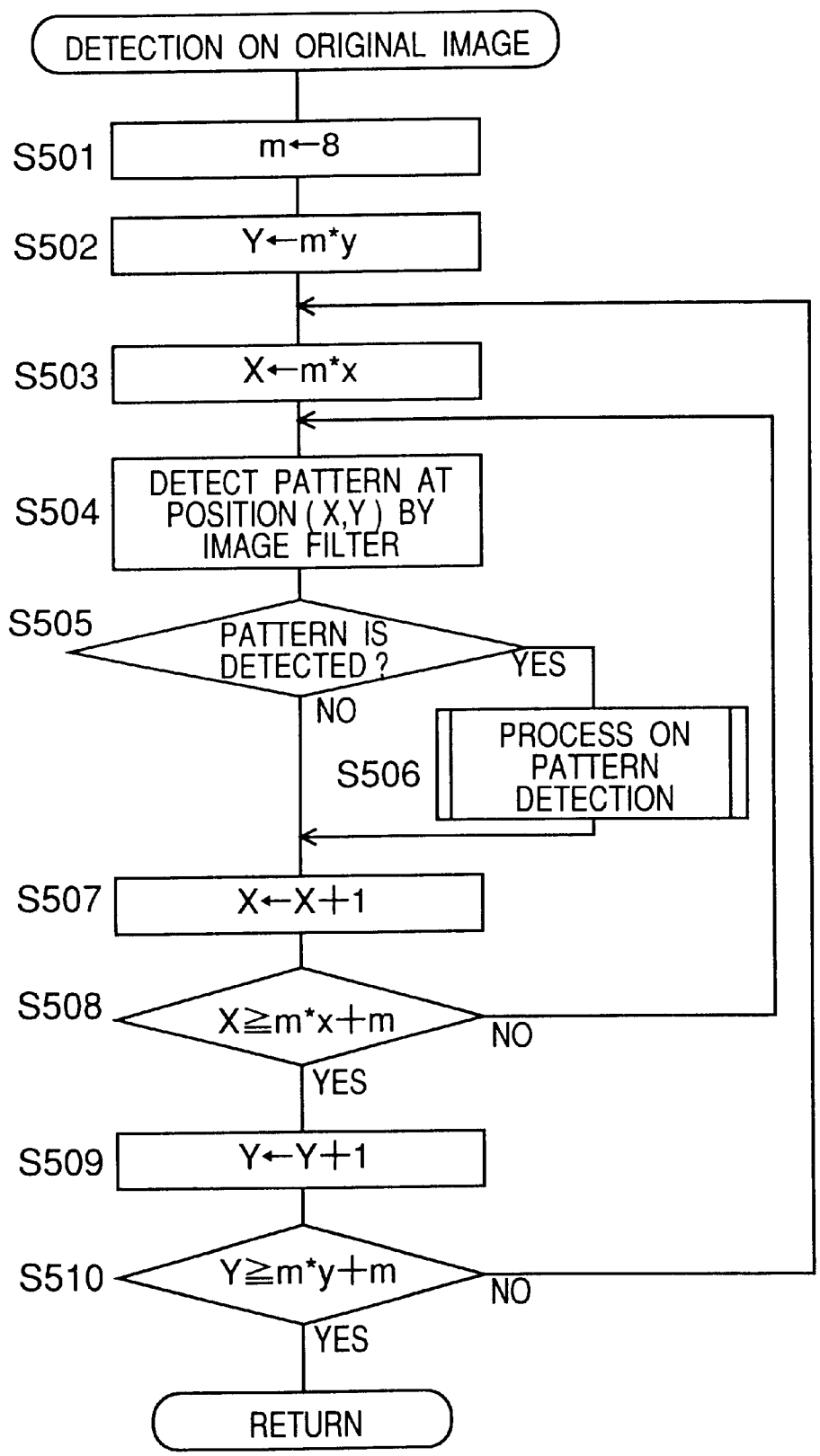
FIG. 10 is a flowchart showing the detecting process on an original image.

The retrieving process on the original image (step S405) will be described with reference to a flowchart shown in FIG. 10. A position on the original image 20 corresponding to the position on the map image 22 where the region specifying pattern is detected is obtained, and a specific pattern is retrieved by using the image filter 20f in the retrieving region set based on this position.

Figure 11:
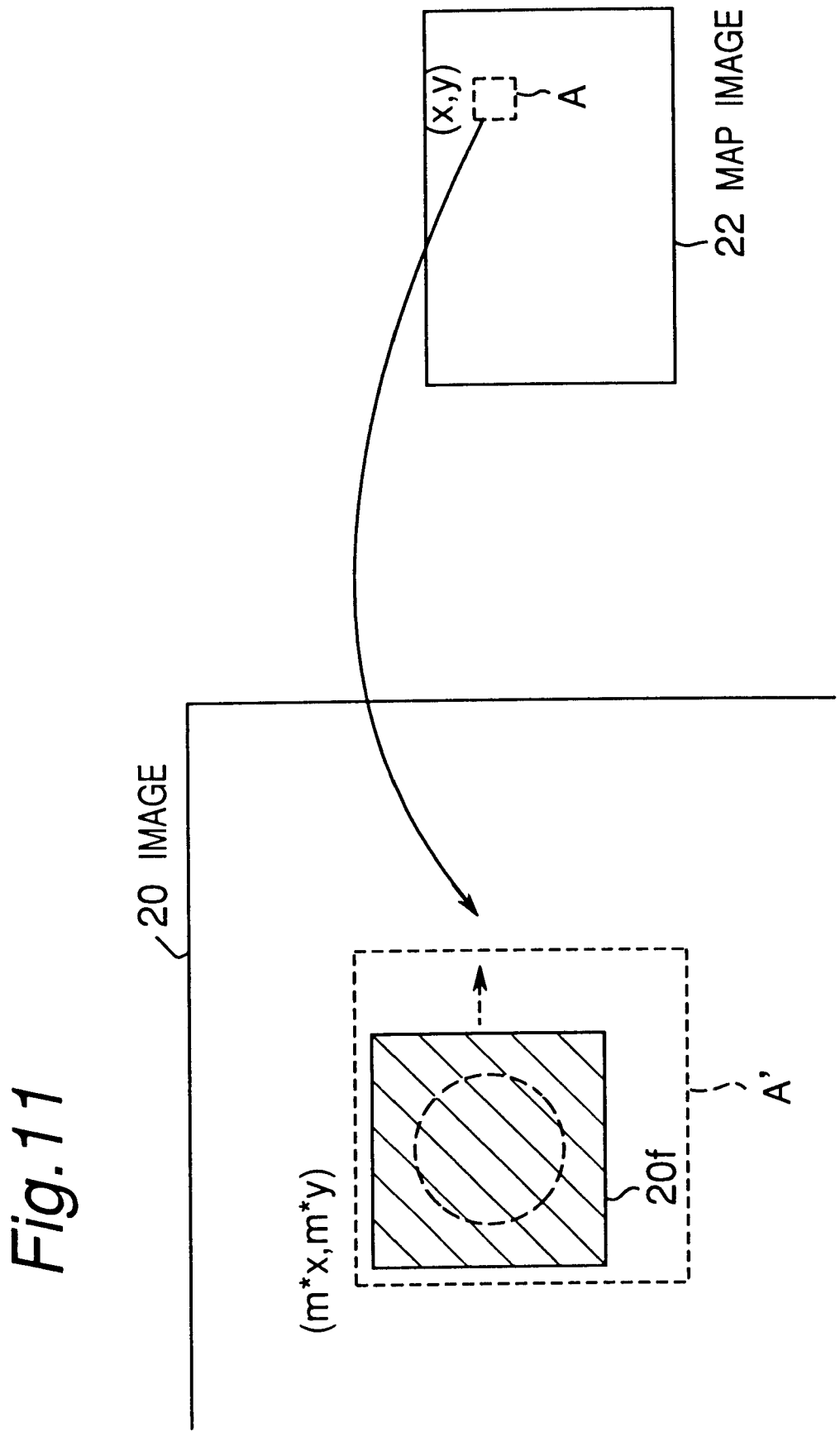
FIG. 11 is a diagram illustrating a correspondence of a position A specified on the map image and a search region A' (scanning range) on the original image.

First of all, a block size of 8 is assigned to a variable m for storing a block size (S501). The block size may be 2 or more. A position (X, Y) on the original image 20 corresponding to a position (x, y) of the region specifying pattern detected on the map image 22 is calculated (S502, S503). The corresponding position (X, Y) on the image 20 can be obtained by multiplying, by m, each position (x, y) on the map image 22 where the region specifying pattern is detected. As shown in FIG. 11, a block A' (X, Y) on the image 20 corresponding to a pixel A of the coordinate (x, y) on the map image 22 as shown in FIG. 11 indicates the following rectangular region:

$$X = m \times x \sim m \times (x+1) - 1$$

$$Y = m \times y \sim m \times (y+1) - 1.$$

By scanning the image 20 using the image filter 20f within this range, a specific pattern is detected.

When the position (X, Y) of the image filter 20f is determined, a specific pattern is detected by using the imager filter 20f in that position (S504). The specific pattern is detected by using the image filter 20f in the following manner, for example. The feature amount of each pixel is extracted in the central portion of the image filter 20f shown in FIG. 8 (a region hatched with a dot) and a peripheral portion thereof (a region hatched in a slant line). When the extracted feature amount is within a predetermined range, the pixel is labeled. Next, the labeled pixel is counted in the central and peripheral portions of the image filter 20f, respectively. When each of results obtained by counting is within a predetermined range in each of the central and peripheral portions, a specific pattern is decided to be detected. In this case, a specific pattern is present in the central portion of the image filter 22f (in a circle shown in a broken line of the drawing).

Next, it is decided whether or not the specific pattern is detected (S505). When the specific pattern is detected, a predetermined process to be performed is carried out (S506). The predetermined process includes, for example, a process of recording the detected coordinate value of the pattern on a storage device such as a hard disk, a process of displaying, on a display unit, a message saying that the specific pattern has been detected, and the like. When the specific pattern is not detected, the step S506 is skipped. Then, the X coordinate of the image filter 20f is incremented (S507) and it is decided whether or not the right end of the image filter 20f gets over a scanning range (S508). When the image filter 20f does not get over the right end, the routine returns to the step S504 where a specific pattern is detected in a new position shifted in the X direction in the same manner as described above. When the right end of the image filter 20f gets over the scanning range, the Y coordinate of the image filter 20f is incremented (S509) and it is decided whether or not the lower end of the image filter 20f gets over the scanning range (S510). When the image filter 20f does not get over the lower end, the routine returns to the step S503 where a specific pattern is detected in a position on the left end of the scanning range which is lower by one line than the position at the last time. The above-mentioned processes (S503 to S510) are repeated until the scanning operation by the image filter 20f over the predetermined scanning range is completed.

As described above, the image processing apparatus according to the present embodiment creates the map image 22 having pixels each corresponding to the block region of the original image 20 by one to one, and each pixel of the map image 22 is labeled based on the feature amount of the image 20, when the specific pattern is retrieved from the image 20. Then, the region where the specific pattern is present is specified on the image based on the pattern of the map image 22 formed by the labeling, and the process of retrieving a specific pattern is carried out in the region on the original image 20 corresponding to the specified region on the map image 22. More specifically, when the block size of the original image 20 is m×n, the size of the map image 22 is one m*nth of the image 20 and is smaller than the image 20. Therefore, the position of the specific pattern is specified by using the map image 22 having a smaller size so that a working region required for the process is reduced. Furthermore, a processing time to be required can also be shortened. As a result, the specific pattern on the image can be retrieved at a high speed. Moreover, since the map image 22 is labeled based on the feature amount of the original image 20, the characteristics of the original image 20 are kept. Consequently, it is possible to specify the detection region with high precision.

Second Embodiment

An image processing apparatus according to the present embodiment serves to detect and label, as a connecting region in a binary image, a continuous region composed of pixels which have same pixel values.

(Main Routine of Image Processing Apparatus)

Figure 12:
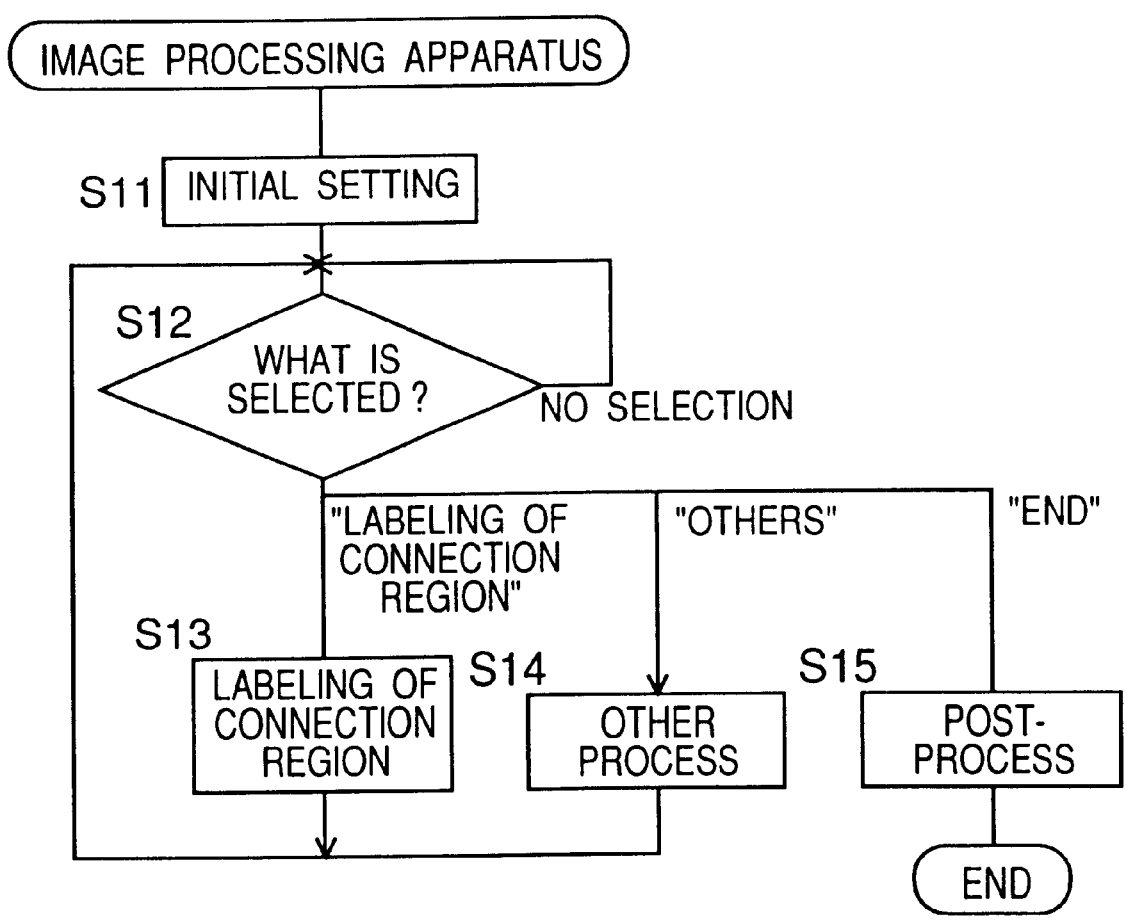
FIG. 12 is a flowchart showing a main routine in the image processing apparatus according to a second embodiment.

FIG. 12 is a flowchart showing a main routine of a program to be executed by a CPU 201 in a system according to the present embodiment. When "LABELING OF CONNECT RERGION" is selected at a step S2, the labeling process is performed in which a connecting region in an input image is labeled (S13). The labeling processing of a connecting region (step S13) will be described below.

(Labeling Process of Connecting Region)

The image processing apparatus detects and labels, as a connecting region, a continuous region including pixels each having a value of "1" in a binary image constituted by a pixel having a value of "0" or "1". The image processing apparatus detects a connecting region in the image by scanning the image. The scanning operation is carried out as shown in FIG. 4. First of all, the scanning starts from the left upper end of the image 20, and then is shifting in the right direction (x direction). Returning to the left end of the image and shifts downward (in y direction) by one line when the scanning reaches to the right end of the image 20, the scanning is shifting from the position in the x direction.

Figure 13:
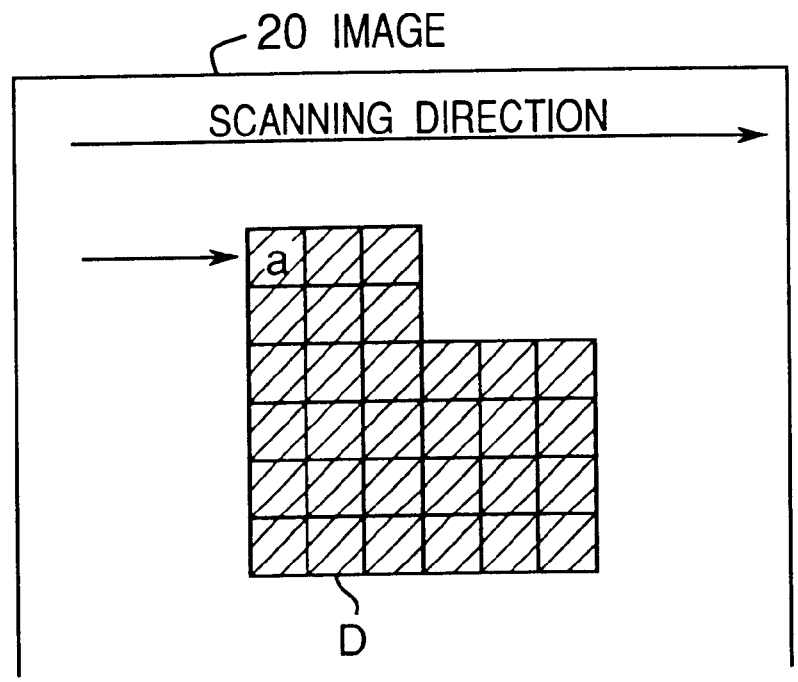
FIG. 13 is a diagram illustrating the scanning of a connecting region.

When there is a connecting region D in the image 20 as shown in FIG. 13, the image processing apparatus scans the image 20. When one pixel (a) (having a pixel value of "1") constituting the connecting region D is first detected, it is examined whether or not a pixel adjacent to the pixel (a) constitutes the connecting region D together with the pixel (a). When the adjacent pixel constitutes the connecting region D, it is examined whether or not a pixel adjacent to the adjacent pixel similarly constitutes the connecting region D. When the adjacent-adjacent pixel constitutes the connecting region D, a pixel adjacent to the adjacent-adjacent pixel is further examined in the same manner. As long as a pixel constituting the connecting region D is continuously detected in the same manner, the same examination is carried out for a pixel adjacent to the detected pixel.

Figure 14:
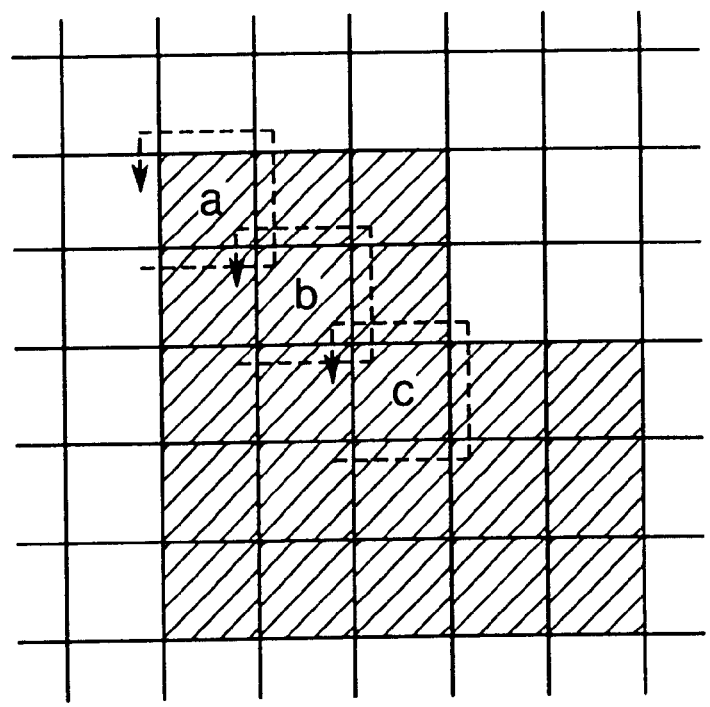
FIG. 14 is a diagram illustrating a state of expansion of adjacent pixels to be examined.

As shown in FIG. 14, when the pixel (a) is first detected as a pixel constituting the connecting region D, it is examined whether or not the value of a pixel adjacent to the pixel (a) is "1". When a pixel (b) having a value of "1" adjacent to the pixel (a) is found, a pixel adjacent to the pixel (b) is further examined. When a pixel (c) having a value of "1" adjacent to the pixel (b) is found, a pixel adjacent to the pixel (c) is further examined. Subsequently, as long as the pixel having a value of "1" is found, the examination is continued in the same manner. Consequently, it is possible to finally detect one connecting region D, that is, all the pixels constituting the connecting region D. Then, all the detected pixels are labeled with the same number.

Figure 15:
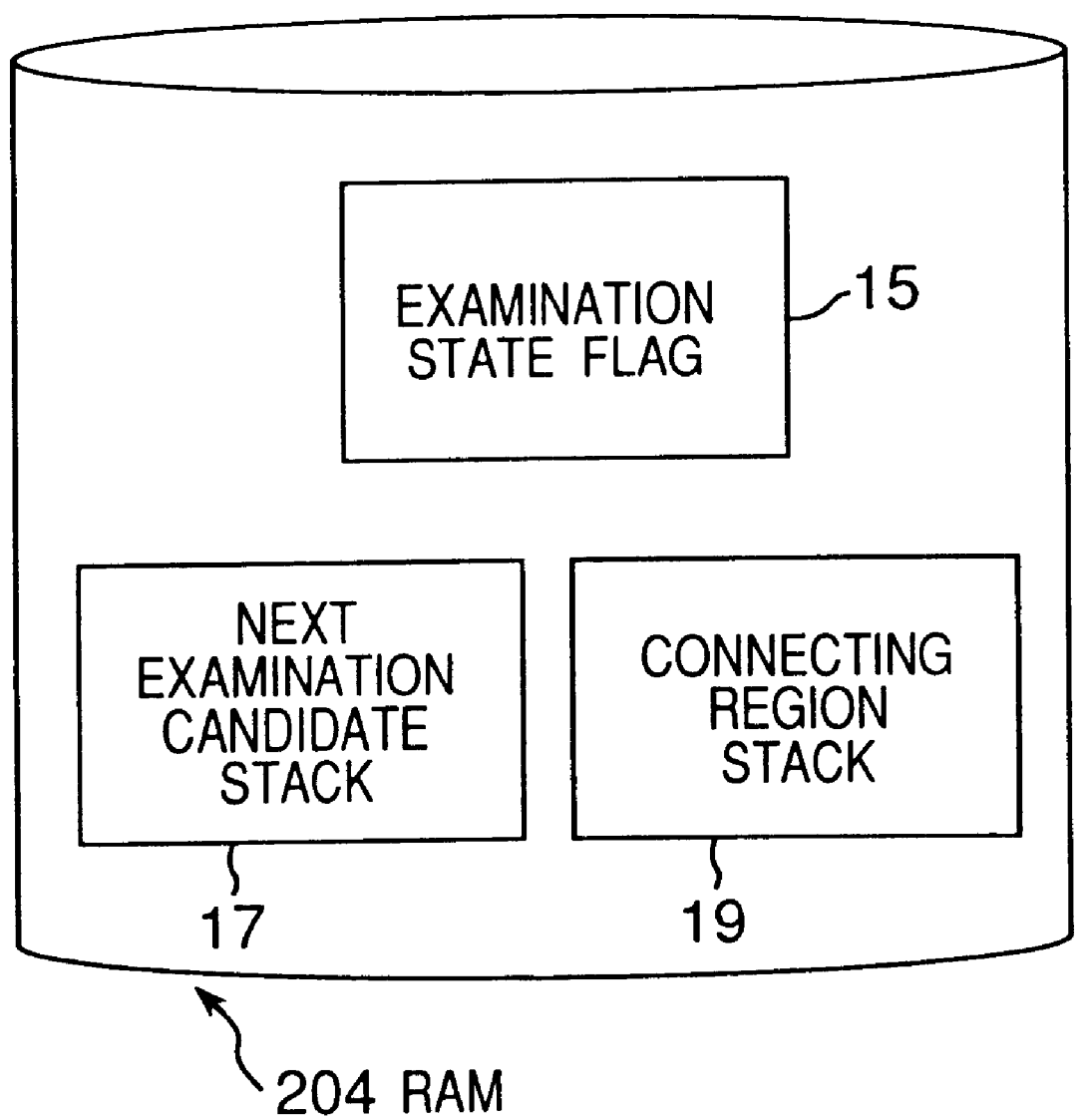
FIG. 15 is a diagram showing an examination-end flag, a next examination candidate stack and a connecting region stack which are logically constituted on a RAM.

To implement the above process, the image processing apparatus has an examination state flag, a next examination candidate stack and a connecting region stack. These are logically constituted on a RAM 204 as shown in FIG. 15, for example. The examination state flag 15 includes an examination-end flag which corresponds to each pixel of the image 20 and indicates whether or not each pixel has been examined. For example, the examination state flag comprises one-dimensional array data, and one array specified by the index of a pixel corresponds to one examination-end flag. The index is information such as a number for specifying each pixel in an image. The examination-end flag of "1" (ON) indicates that the pixel has been examined, and the examination-end flag of "1" (OFF) indicates that the pixel has not been examined yet. A next examination candidate stack 17 serves to store the index of a pixel to which adjacent pixel is to be examined. A connecting region stack 19 serves to store the index of a pixel constituting the connecting region. Both stacks 17 and 19 are memories or storage means having a Last In First Out (LIFO) function. By pushing, data are stored in the stacks 17 and 19, and by popping, the stored data are fetched from the stacks 17 and 19. Both stacks 17 and 19 may store other information for specifying a pixel in place of the index of a pixel. The stacks 17 and 19 may also be implemented by storage means without LIFO function. In this case, it is necessary to separately manage information about the fact that data are read out from the storage means.

Figure 16:
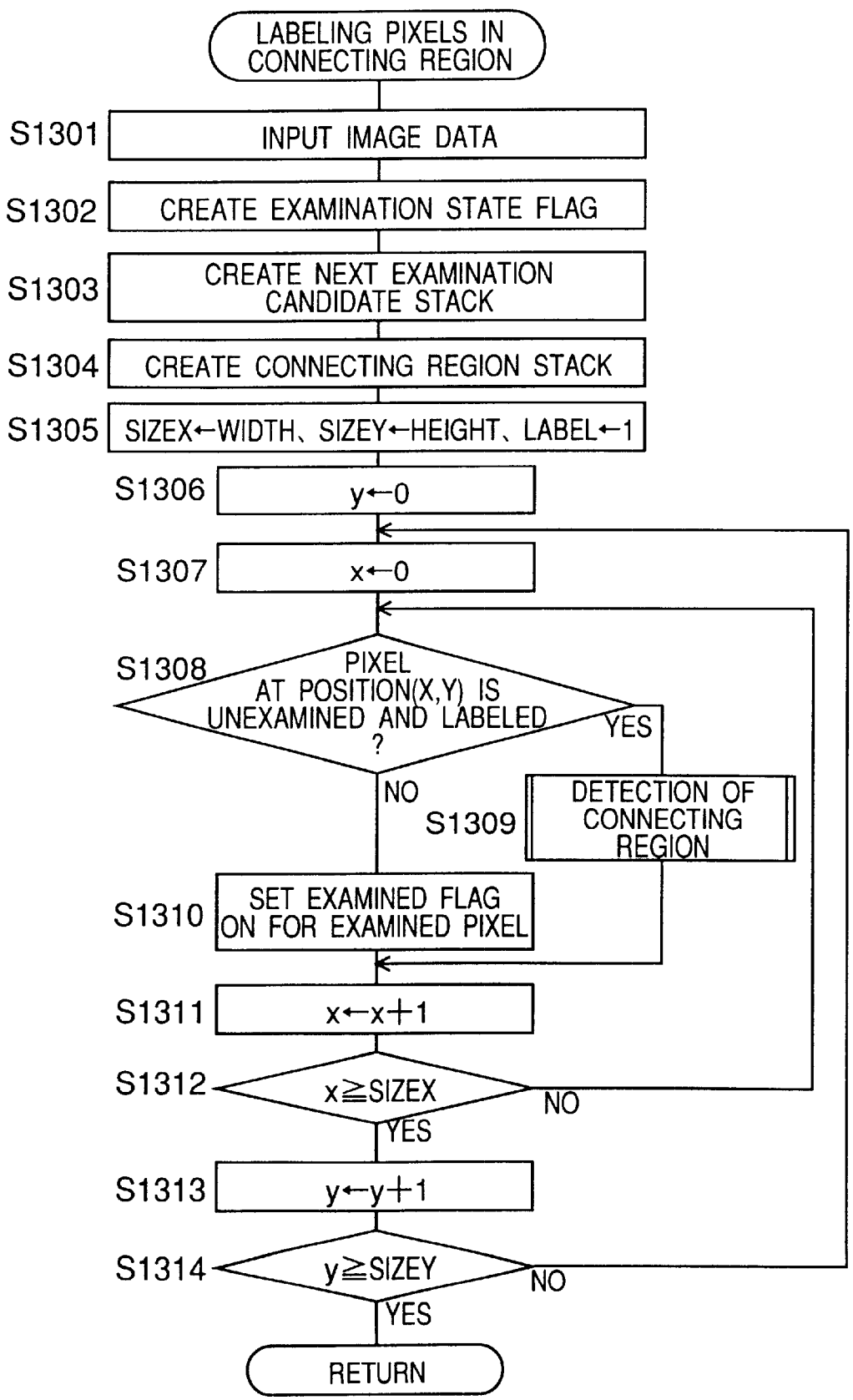
FIG. 16 is a flowchart showing a labeling process of the connecting region.
Figure 17:
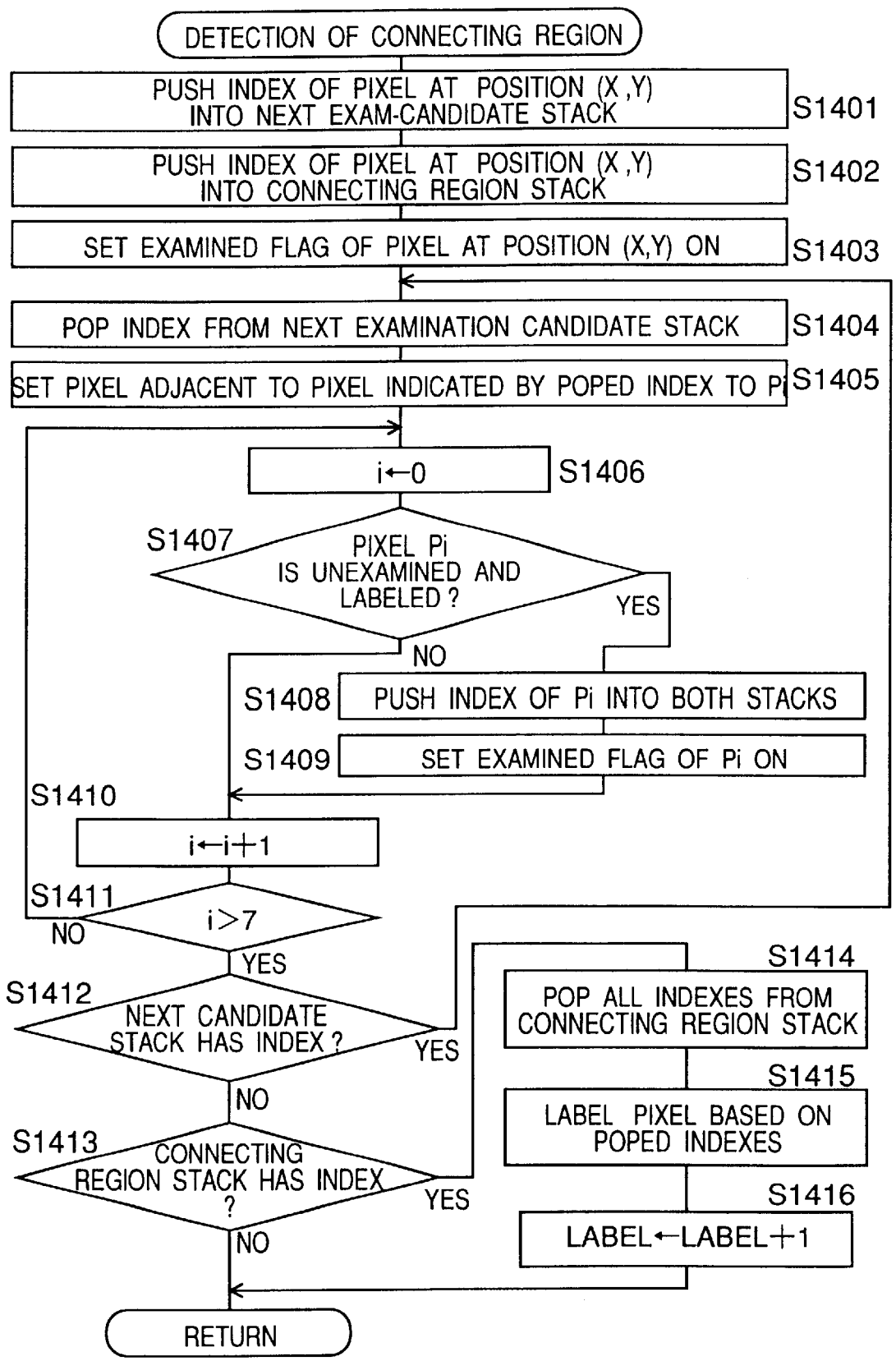
FIG. 17 is a flowchart showing a connecting region detecting process.

The above-mentioned labeling process of the connecting region (step S13) will be described with reference to flowcharts shown in FIGS. 16 and 17.

Figure 18A:
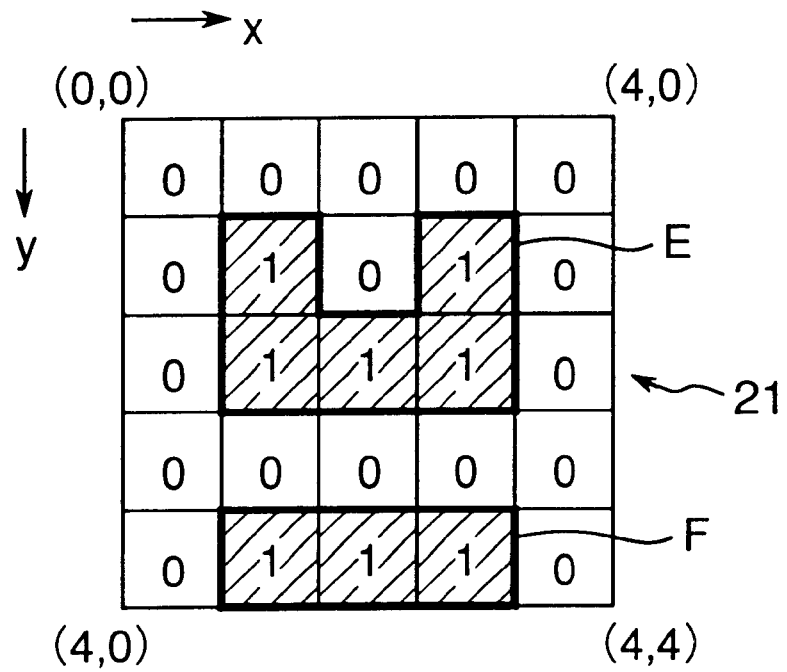
FIG. 18A is a diagram showing an image including the connecting region comprising pixels with values of "1".
Figure 18B:
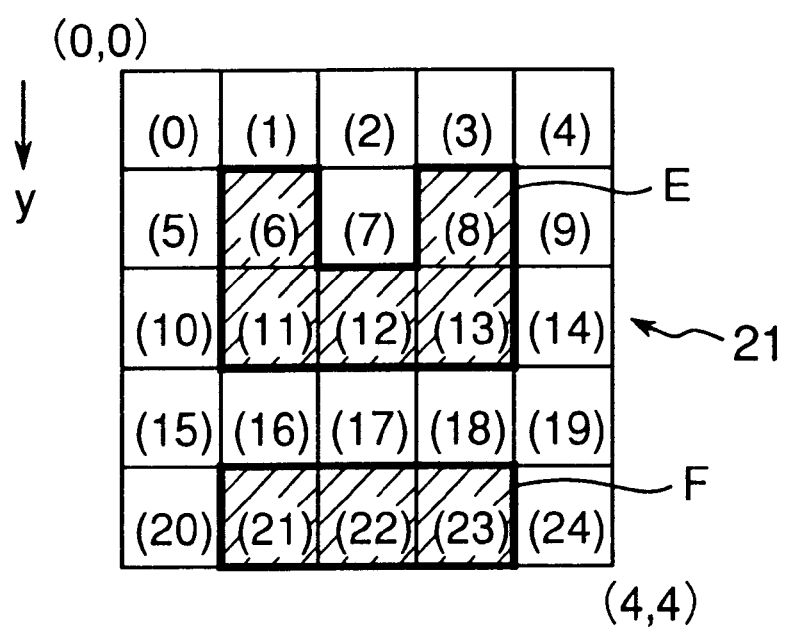
FIG. 18B is a diagram showing the index of each pixel of an image including the connecting region.

In the following description, an image 21 shown in FIG. 18A is used as an image to be subjected to the labeling process. The image 21 has a size of 5 pixels×5 pixels, and has two connecting regions E and F. In FIG. 18A, a value indicated in each pixel of the image 21 means a pixel value. In FIG. 18B, a numeral in parentheses which is allocated to each pixel of the image 21 means the index of the pixel. The index is calculated by a following equation based on a coordinate value (x, y);

pixel index=x+y×(image size in the x direction).

The flowchart shown in FIG. 16 will be described. When the present process is started, the image data of the binary image 21 are first input (S1301). More specifically, the image data of the binary image 21 are loaded into the RAM 204. Next, the examination state flag 15 is created (S1302). That is, the working region of the examination state flag 15 is kept in a predetermined region on the RAM 204 and the examination-end flag constituting the examination state flag 15 is initialized to "0". In the case in which the value of each pixel is indicated by a plurality of bits, the examination state flag 15 can also be implemented by assigning one of the plurality bits to the examination-end flag.

Next, the next examination candidate stack 17 and the connecting region stack 19 are created (S1303, S1304) More specifically, the working regions of the next examination candidate stack 17 and the connecting region stack 19 are held in predetermined regions on the RAM 204. Next, variables SIZEX, SIZEY and LABEL are initialized (S1305). Concretely, the variable SIZEX is set to the x-direction size value of the image 21 (for example, 5), the variable SIZEY is set to the y-direction size value of the image 21 (for example, 5), and the variable LABEL is set to 1. The variable LABEL gives a label number for labeling the connecting region. Next, a variable y for giving the y coordinate of an examination position is initialized to 0 (S1306), and furthermore, a variable x for giving the x coordinate of the examination position is initialized to 0 (S1307).

It is decided whether or not a pixel in a position (x, y) has not been examined yet but has been labeled (that is, a pixel value is "1") (S1308). It can be decided whether or not the pixel has been examined, with referring to the examination state flag 15. Consequently, repetitive examinations can be avoided and a time required for the processing can be shorted. At this step, it is an object to first detect one of pixels constituting independent connecting regions in the image. A pixel detected at this step is referred to as "the first pixel of the connecting region".

When the pixel has not been examined yet but has been labeled, that is, the fist pixel of the connecting region is detected, a connecting region detecting process for detecting and labeling a connecting region including the pixel (S1309) is carried out, and the routine then proceeds to a step S1311. The connecting region detecting process will be described below in detail. On the other hand, when the pixel has not been examined or labeled, the examination-end flag is set to ON for the examined pixel (S1310) and the routine then proceeds to a step S1311.

At the step S1311, the variable x is incremented to shift the examination position in the x direction, and then the variable x is compared with the variable SIZEX to decide whether or not the examination position is outside the range of the image 21 (S1312). When the examination position is within the range of the image 21 as a result of the decision, the routine returns to the step S1308 where the connecting region is examined in a new position shifted in the x direction in the same manner as described above. On the other hand, when a next examination position is outside the range of the image 21 as a result of the decision, the variable y is incremented to shift the examination position in the y direction (S1313), and the variable y is then compared with the variable SIZEY to decide whether or not the examination position is outside the range of the image 21 (S1314). When the examination position is within the range of the image 21, the routine returns to the step S1307 where the connecting region is examined in a new position on the left end of the image 21 which is lower by one line than the last position, in the same manner as described above at the last time. When the next examination position is outside the range of the image 21, the routine returns. The above-mentioned processes are repeated until the whole image 21 is examined and all the connecting regions included in the image are detected to be labeled (S1307 to S1314).

Next, the above-mentioned connecting region detecting process (step S1309) is described with reference to the flowchart shown in FIG. 17. In the process, it is examined whether or not a pixel on the periphery of the first pixel of the connecting region constitutes the same connecting region, thereby detecting and labeling the connecting region.

Figure 19:
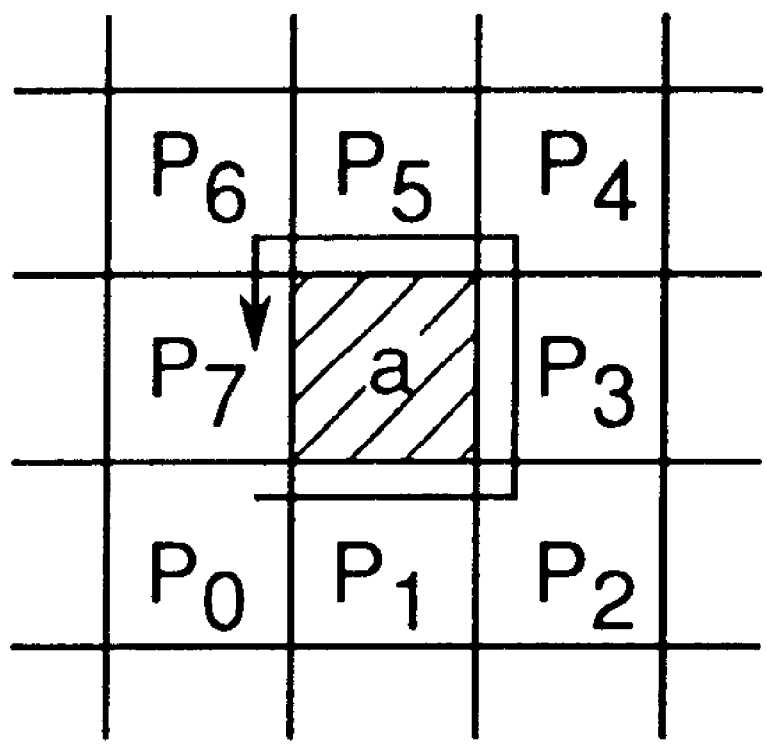
FIG. 19 is a diagram illustrating pixels adjacent to the pixel to be examined.
Figure 21:
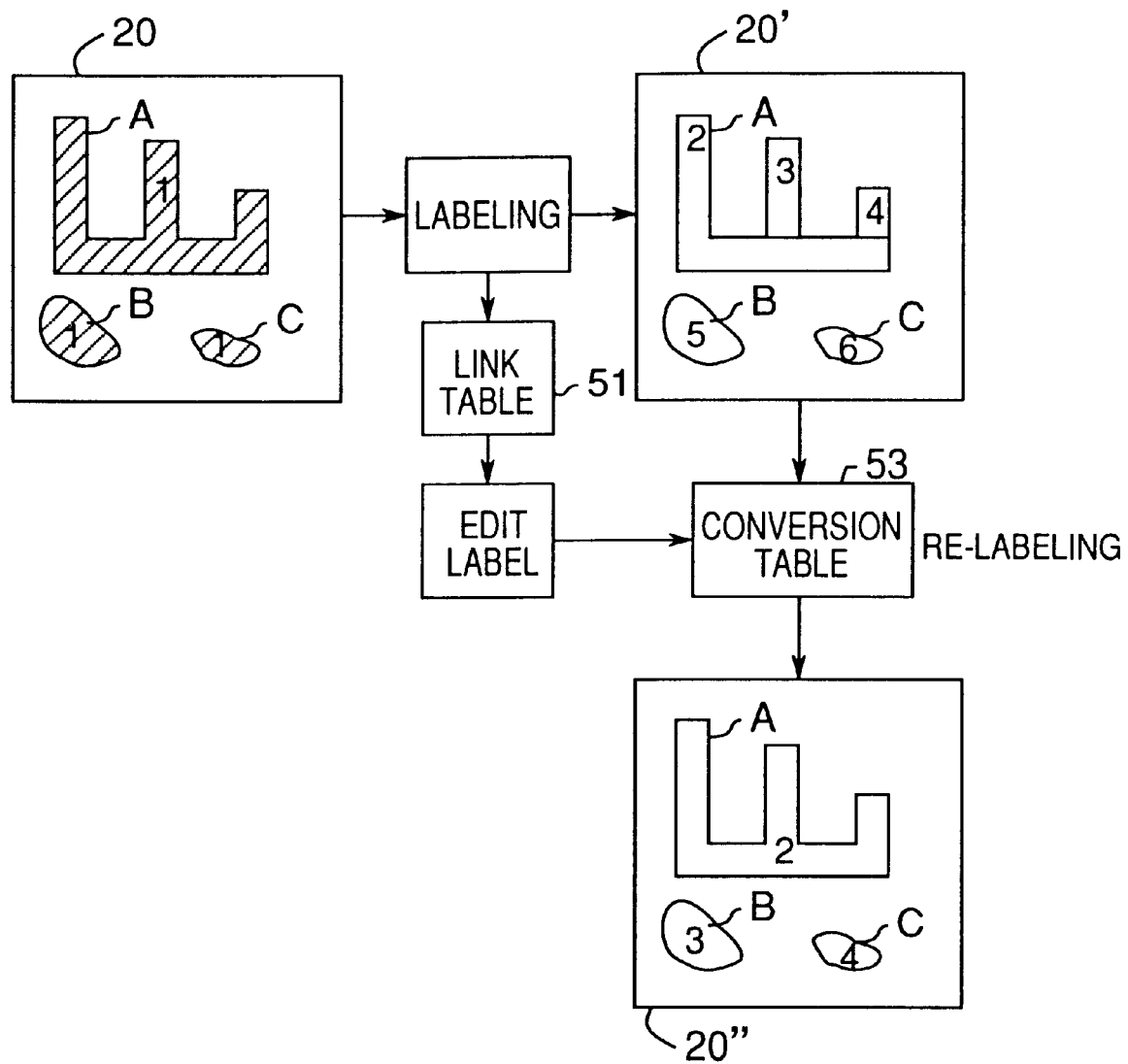
FIG. 21 is a diagram illustrating a labeling process in a connecting region according to the prior art.

The index of the first pixel of the connecting region, that is, a pixel in a current coordinate position (x, y) is first pushed into the next examination candidate stack 17 (S1401), and is also pushed into the connecting region stack 19 (S1402). The examination-end flag of the first pixel of the connecting region is set ON (S1403). Then, the index is popped from the next examination candidate stack 17 (S1404). The coordinates of a pixel Pi (i=0 to 7) adjacent to a pixel indicated by the popped index are set respectively (S1405). The adjacent pixel Pi sequentially sets pixels of P0, P1, P2, . . . P7 counterclockwise from the lower left pixel in eight pixels around a central pixel (the pixel (a)) as shown in FIG. 19. Four pixels on the upper, lower, right and left portions to the central pixel may be set as the adjacent pixel.

Next, a variable i for specifying the adjacent pixel $P_i$ is initialized to 0 (S1406). It is decided whether or not the adjacent pixel $P_i$ indicated by the variable i has not been examined but has been labeled (S1407). When the pixel has not been examined but has been labeled, the index of the pixel $P_i$ is pushed into both stacks 17 and 19 (S1408). Then, the examination-end flag of the pixel $P_i$ is set ON (S1409). When the pixel has been examined or not labeled, these steps (S1408, S1409) are skipped. Thereafter, the variable i is incremented (S1410), and the above-mentioned process (S1406 to S1411) are repeated until the end of the examination whether or not all the adjacent pixels $P_i$ are in the connecting region.

When the examination for all the adjacent pixels $P_i$ is completed, the presence of an index stored in the next examination candidate stack 15 is confirmed (S1412) When there is an index stored in the stack 15, the routine returns to the step S1404. When there is no index stored in the next examination candidate stack 15, the routine proceeds to a step S1413. Thus, as long as the index is stored in the next examination candidate stack 15, the connecting region is examined for a pixel adjacent to the pixel indicated by the index stored in the next examination candidate stack 15 (S1404 to S1412). One connecting region is constituted by pixels indicated by all the indexes stored in the connecting region stack 17 when there is no index stored in the next examination candidate stack 15.

When there is no index stored in the next examination candidate stack 15, the presence of the index stored in the connecting region stack 17 is confirmed (S1413). When there is no index stored in the connecting region stack 17, the routine returns. When there is at least one index stored in the connecting region stack 17, all the indexes are popped from the connecting region stack 17 (S1414), and the pixel indicated by the popped index is labeled with a label number indicated by the variable LABEL (S1415). Then, the variable LABEL is incremented (S1416) and the routine then returns.

In the above-mentioned process, when the size of the connecting region is smaller than a predetermined value, the region may be treated as a noise so as not to carry out the labeling process. In that case, for example, a process for initializing the variable SUM to 0 is added in the step S1305 of the above flowchart, and furthermore a step for incrementing the variable SUM is added between the steps S1402 and S1403 and between the steps S1408 and S1409. Furthermore, the step S1413 is changed such that the variable SUM is compared with a predetermined value and the routine proceeds to the step S1414 when the variable SUM is equal to or greater than the predetermined value and the routine otherwise returns. The predetermined value, for example, is set to 8 in the case where a small connecting region having pixels less than eight pixels is to be ignored as a noise. Furthermore, when the connecting region size exceeds a maximum size, the labeling process of the connecting region can be terminated. At this time, the step S413 is changed such that the variable SUM is compared with a predetermined value (a maximum size value) and the routine returns when the variable SUM is equal to or greater than a predetermined value, or otherwise the routine proceeds to the step S1414. While the size of the connecting region is calculated by the number of pixels constituting the connecting region as described above, the size of the connecting region may be obtained from the sizes of the detected connecting region in the x and y directions.

FIGS. 20A to 20H are diagrams showing a change in the states of the examination state flag 15, the next examination candidate stack 17 and the connecting region stack 19 which are obtained when the image 21 is subjected to the connecting region labeling process according to the process of the flowchart described above.

FIG. 20A shows a state before the examination is started. All the examination-end flags are initialized to "0" and no index is stored in both stacks 17 and 19. FIG. 20B shows a state in which the first pixel of the connecting region is detected. The pixel of an index of "6" is detected as the first pixel in the connecting region, and the index of "6" is pushed into the next examination candidate stack 17 and the connecting region stack 19. FIG. 20C shows a state in which the index of "6" is popped from the next examination candidate stack 17 and the examination of the pixel $P_0$ adjacent to the first pixel in the connecting region specified by the index is completed. The examination-end flag of the pixel $P_0$ is set to "1". FIG. 20D shows a state in which the examination of the adjacent pixel $P_1$ is completed. The pixel $P_1$ has not been examined yet but has been labeled. Therefore, the examination-end flag is set to "1" and an index of "11" of the pixel $P_1$ is pushed into the next examination candidate stack 17 and the connecting region stack 19. FIG. 20E shows a state in which the examination of the adjacent pixel $P_2$ is completed. The pixel $P_2$ has not been examined but has been labeled. Therefore, the examination-end flag is set to "1" and an index of "12" of the pixel $P_2$ is pushed into the next examination candidate stack 17 and the connecting region stack 19.

Figures 20F, 20G, 20H:
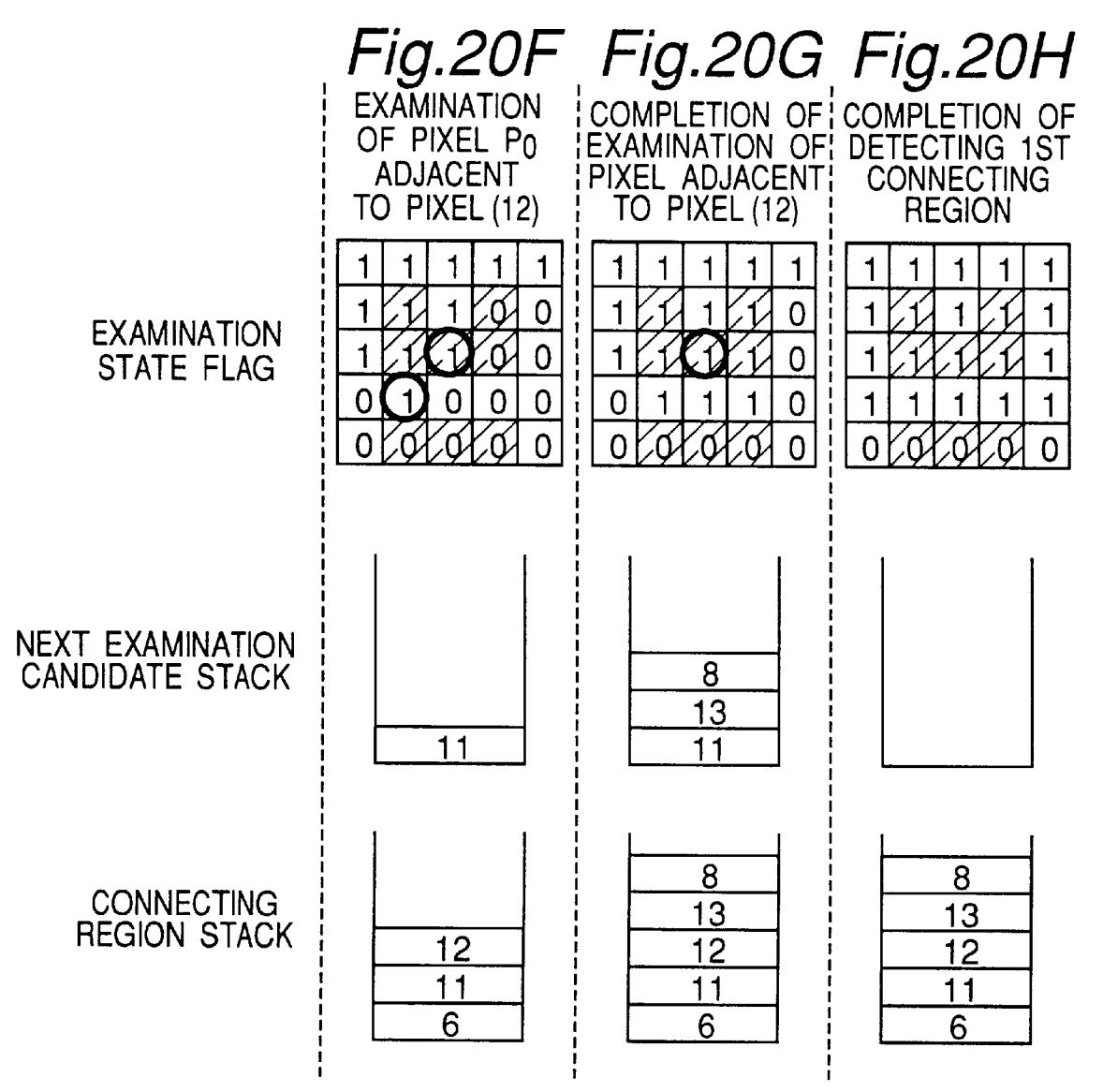

Then, after completion of the examination of all the adjacent pixels $P_0$ to $P_7$ of the first pixel in the connecting region, the next examination candidate stack 17 is popped to fetch the index of "12". Thereafter, the pixel adjacent to the pixel specified by the index of "12" is examined. FIG. 20F shows a state in which the examination is completed for the pixel $P_0$ adjacent to the pixel indicated by the index of "12". The examination-end flag of the pixel $P_0$ is set to "1". FIG. 20G shows a state in which the examination is completed for the pixels $P_0$ to $P_7$ adjacent to the pixel indicated by the index of "12". As a result of the examination of the adjacent pixel, the indexes of "13" and "8" are pushed into the next examination candidate stack 17 and the connecting region stack 19.

Then, the next examination candidate stack 17 is sequentially popped until it becomes empty, and pixels adjacent to the pixels indicated by the indexes popped from the next examination candidate stack 17 are examined. FIG. 20H shows a state in which the examination is completed for the pixel adjacent to the pixel indicated by the index of "11" which is popped from the next examination candidate stack 17. The index stored in the connecting region stack 19 at this time indicates a pixel constituting a first connecting region E of the image 21.

As described above, the image processing apparatus according to the present embodiment detects each of the independent connecting regions. Therefore, the label number is determined for the region simultaneous with the detection of the connecting region. Consequently, a work for re-labeling a label number according to the prior art is not required. Accordingly, the work for re-labeling the connecting region can be carried out by one-time image scanning. Therefore, it is not necessary to carry out the scanning twice differently from the prior art, and the labeling process can be executed at a high speed. Moreover, the connecting region is detected one by one for the labeling. Therefore in the environment capable of executing the parallel processing, in the image labeling process, for example, a predetermined process including image recognition process can be carried out for the detected one connecting region, while the other connecting regions can be detected.

Numerous modifications and alternative embodiments of the invention will be apparent to those skilled in the art in view of the foregoing description. Accordingly, this description is to be construed as illustrative only, and is provided for the purpose of teaching those skilled in the art the best mode of carrying out the invention. The details of the structure and/or function may be varied substantially without departing from the spirit of the invention and all modifications which come within the scope of the appended claims are reserved.

What is claimed is:

1. An image processing apparatus for retrieving a specific pattern of an image comprising:
    a unit for dividing the image into a plurality of block regions, each of the block regions having a predetermined size;
    a unit for creating a map image comprising a plurality of pixels, each of the pixels corresponding to one of the block regions by one to one;
    a unit for extracting features of the image for each of the block regions;
    a unit for deciding whether or not the extracted feature meets a predetermined condition;
    a unit for labeling the pixel on the map image based on a result of the decision, the pixel corresponding to the block region of which feature meets the condition;
    a unit for detecting a predetermined pattern for specifying a search region on the image from the labeled map image;

a unit for specifying the search region based on a position on the map image in which the predetermined pattern is detected; and a unit for retrieving the specific pattern in the specified search region on the image.

2. The apparatus according to claim 1, wherein at least one of a concentration value of a pixel, an edge amount and a co-occurrence characteristic is extracted as the feature amount.

3. The apparatus according to claim 1, wherein the predetermined pattern for determining the search region is detected by using a filter having the same size as a size of the specific pattern in the map image.

4. An image processing method for retrieving a specific pattern of an image comprising:

dividing the image into a plurality of block regions, each of the block regions having a predetermined size;

creating a map image comprising a plurality of pixels, each of the pixels corresponding to one of the block regions by one to one;

extracting features of the image for each of the block regions;

deciding whether or not the extracted feature meets a predetermined condition;

labeling the pixel on the map image based on a result of the decision, the pixel corresponding to the block region of which feature meets the condition;

detecting a predetermined pattern for specifying a search region on the image from the labeled map image;

specifying the search region based on a position on the map image in which the predetermined pattern is detected; and retrieving the specific pattern in the specified search region on the image.

5. The method according to claim 4, wherein at least one of a concentration value of a pixel, an edge amount and a co-occurrence characteristic is extracted as the feature amount.

6. The method according to claim 4, wherein the predetermined pattern for determining the search region is detected by using a filter having the same size as a size of the specific pattern in the map image.

7. A computer readable recording medium in which a program for controlling the computer to retrieve a specific pattern from an image, the program being capable of executing the following functions:

a function for dividing the image into a plurality of block regions, each of the block regions having a predetermined size;

a function for creating a map image comprising a plurality of pixels, each of the pixels corresponding to one of the block regions by one to one;

a function for extracting features of the image for each of the block regions;

a function for deciding whether or not the extracted feature meets a predetermined condition;

a function for labeling the pixel on the map image based on a result of the decision, the pixel corresponding to the block region of which feature meets the condition;

a function for detecting a predetermined pattern for specifying a search region on the image from the labeled map image;

a function for specifying the search region based on a position on the map image in which the predetermined pattern is detected; and a function for retrieving the specific pattern in the specified search region on the image.

8. The medium according to claim 7, wherein at least one of a concentration value of a pixel, an edge amount and a co-occurrence characteristic is extracted as the feature amount.

9. The medium according to claim 7, wherein the predetermined pattern for determining the search region is detected by using a filter having the same size as a size of the specific pattern in the map image.

* * * * *